US008862805B2

(12) United States Patent
Yamamoto et al.

(10) Patent No.: US 8,862,805 B2
(45) Date of Patent: Oct. 14, 2014

(54) STORAGE SYSTEM AND METHOD FOR COMPRESSING STORED DATA

(75) Inventors: Akira Yamamoto, Sagamihara (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 184 days.

(21) Appl. No.: 13/140,327

(22) PCT Filed: Jun. 7, 2011

(86) PCT No.: PCT/JP2011/003204
§ 371 (c)(1),
(2), (4) Date: Jun. 16, 2011

(87) PCT Pub. No.: WO2012/168962
PCT Pub. Date: Dec. 13, 2012

(65) Prior Publication Data
US 2012/0317333 A1 Dec. 13, 2012

(51) Int. Cl.
*G06F 12/00* (2006.01)
*G06F 3/06* (2006.01)

(52) U.S. Cl.
CPC ............. *G06F 3/0665* (2013.01); *G06F 3/064* (2013.01); *G06F 3/0688* (2013.01); *G06F 3/0608* (2013.01)
USPC .................... 711/103; 711/E12.008; 711/114

(58) Field of Classification Search
CPC ... G06F 3/0608; G06F 3/0631; G06F 3/0679; G06F 3/0601; G06F 3/064; G06F 3/068; G06F 2212/7202; G06F 2212/401; G06F 12/0246; G06F 2003/0694; G06F 8/65; G11C 2207/102
USPC .......................................... 711/103, E12.008
See application file for complete search history.

(56) References Cited

U.S. PATENT DOCUMENTS

| 5,930,193 | A   | * | 7/1999  | Achiwa et al. ........... 365/230.03 |
| 6,343,293 | B1  | * | 1/2002  | Lyle ........................................ 1/1 |
| 6,523,102 | B1  | * | 2/2003  | Dye et al. ....................... 711/170 |
| 2002/0040413 | A1 |   | 4/2002  | Okada et al. |
| 2002/0161932 | A1 | * | 10/2002 | Herger et al. ................. 709/321 |
| 2007/0168624 | A1 | * | 7/2007  | Kaler ............................ 711/154 |
| 2008/0228998 | A1 | * | 9/2008  | Colecchia et al. ............ 711/103 |
| 2008/0229003 | A1 | * | 9/2008  | Mizushima et al. .......... 711/103 |
| 2009/0113152 | A1 | * | 4/2009  | Eguchi et al. ................. 711/162 |
| 2009/0292862 | A1 | * | 11/2009 | Kitahara ....................... 711/103 |
| 2010/0011185 | A1 | * | 1/2010  | Inoue et al. ................... 711/172 |
| 2010/0011239 | A1 | * | 1/2010  | Kawaguchi et al. ............. 714/6 |
| 2010/0235573 | A1 | * | 9/2010  | Asano et al. .................. 711/114 |

(Continued)

FOREIGN PATENT DOCUMENTS

| JP | 08-249128 A | 9/1996 |
| JP | 3100146 U | 12/2003 |

(Continued)

*Primary Examiner* — Tuan Thai
*Assistant Examiner* — Edward Waddy, Jr.
(74) *Attorney, Agent, or Firm* — Volpe and Koenig, P.C.

(57) ABSTRACT

A storage system has a plurality of flash packages, and a storage controller for receiving a write request from a host and sending a write-data write request based on data conforming to this write request to a write-destination flash package. A virtual capacity, which is larger than the physical capacity of the flash package, is defined in the storage controller. The storage system compresses the write data, and writes the compressed write data to the write-destination flash chip.

18 Claims, 30 Drawing Sheets

(56) References Cited

U.S. PATENT DOCUMENTS

| | | |
|---|---|---|
| 2010/0316114 A1* | 12/2010 | Fallon et al. .................. 375/240 |
| 2010/0325345 A1* | 12/2010 | Ohno et al. ................... 711/103 |
| 2011/0099350 A1* | 4/2011 | Feldman et al. .............. 711/209 |
| 2011/0283046 A1* | 11/2011 | Koseki .......................... 711/103 |
| 2011/0289263 A1* | 11/2011 | McWilliams et al. ........ 711/103 |
| 2012/0005402 A1* | 1/2012 | Yamamoto et al. ........... 711/103 |

FOREIGN PATENT DOCUMENTS

| | | |
|---|---|---|
| JP | 2007-164240 A | 6/2007 |
| JP | 2007199922 A | 8/2007 |
| WO | 2007/049108 A1 | 5/2007 |
| WO | 2011010344 A1 | 1/2011 |

\* cited by examiner

Logical volume information 2000

| | |
|---|---|
| Package group | 2101 |
| Real page address | 2102 |
| Empty page pointer | 2103 |
| Amount of stored page data | 2104 |
| Amount of compressed and stored page data | 2105 |
| Moving state flag | 2109 |
| Transfer- to real page pointer | 2110 |
| Waiting state for transferring | 2111 |

Real page information 2100

Fig. 6

| Flash package ID | 2501 |
|---|---|
| Flash package virtual capacity | 2502 |
| Virtual block capacity | 2503 |

Flash package information 2500

Fig. 8

| Flash package group ID | 2301 |
|---|---|
| Package group RAID type | 2302 |
| Number of real page | 2303 |
| Number of empty real pages | 2304 |
| Flash package pointer | 2305 |
| ⋮ | |
| Flash package pointer | 2305 |
| Number of unavailable real pages | 2306 |

Flash package information 2300

Fig. 9

Virtual block information 3200

Real block information 3300

STORAGE SYSTEM AND METHOD FOR COMPRESSING STORED DATA

TECHNICAL FIELD

The present invention relates to a technology for reducing the capacity of data stored in a flash memory.

BACKGROUND ART

The bit cost of a flash memory is more expensive than that of a magnetic disk, and as such, there is a strong need to reduce the capacity of stored data and to increase apparent capacity.

Furthermore, when rewriting data, the memory characteristics of a flash memory (for example, a NAND flash memory) make it impossible to directly overwrite this data to the physical area in which this data was originally stored. In order to write new data to a physical area in which data is already being stored, it is necessary to execute a delete process in a unit called a "block", which is the flash memory delete unit, and to write the data thereafter. For this reason, in a case where data is to be rewritten, ordinarily the new data is not written to the physical area in which this data was originally stored, but rather, the data is written to a different physical area. When data having the same write-destination logical address is written to a plurality of physical areas and a block becomes full, the latest data (valid data) inside this block is written to a different block, and a process is carried out to make this block usable (to make this block an empty block) by performing a delete process (a process for deleting the data stored in the block) with respect to a block that is full of invalid data. This process will be called a "reclamation process" hereinbelow. For this reason, in a package equipped with one or more flash memories (hereinafter, a flash package), a logical address layer that is separate from a physical address layer is provided as an address layer that appears to be outside of the flash package. A logical address, which is allocated to a physical address, is changed as needed. Furthermore, the logical address does not change when the physical address changes. For this reason, data access using the same logical address is possible from outside the flash package. Consequently, usability can be maintained.

Next, technology for reducing the capacity of stored data will be described. Generally speaking, compression technology is a typical technology for reducing the capacity of stored data. In recent years, a technology called capacity virtualization technology has become known as a technology for reducing the capacity of stored data. Capacity virtualization technology is for showing an apparatus outside the storage system (for example, the host) a virtual capacity that is larger than the physical capacity of a storage device comprising the storage system, and is realized by the storage system controller (hereinafter, the storage controller). This technology makes use of the characteristic by which the amount of data actually stored with respect to the capacity of a user-defined user volume (a logical volume as seen from the standpoint of the user) when the user is actually using the storage system seldom reaches the storage capacity (the user-defined capacity) of this user volume. That is, in a storage system that does not employ capacity virtualization technology, a defined physical capacity is allocated when a volume is defined, and in a storage system in which capacity virtualization technology is being employed, the physical capacity is first allocated when data is actually stored in the storage system. In accordance with this, the storage capacity being consumed in the storage system (the allocated storage capacity) can be reduced, and, in addition, usability can be enhanced since the user does not need to strictly define the capacity of the user volume (for example, since sufficient capacity may simply be defined).

Patent Literature 1 discloses a system in which, in a storage system comprising a storage controller coupled to a large number of flash packages, both the storage controller and the flash packages are equipped with the capacity virtualization technology. In Patent Literature 1, the capacity virtualization technology possessed by the storage controller is called the "higher-level capacity virtualization technology" and the capacity virtualization technology possessed by the flash package is called the "lower-level capacity virtualization technology" to distinguish between the two.

For this reason, the flash package can appear to the storage controller to have a larger capacity than the actual physical capacity of the flash memory. In the capacity virtualization technology, a physical storage area, which is allocated when data has been written, is called a page. In Patent Literature 1, the physical storage area allocated when data has been written is called a "page" in the higher-level capacity virtualization technology realized in accordance with the storage controller. However, the physical storage area allocated when data has been written in the lower-level capacity virtualization technology realized in accordance with the flash package is called a "block", which is the delete unit of the flash memory. In general, the size of a page is highly diverse, but in Patent Literature 1, the size of the page is larger than the size of the block.

When it comes of a flash memory, the delete unit is generally called a "block" as mentioned above, and the read/write unit inside the block is called a "page". Naturally, the size of the block is larger than the size of the page in a flash memory. However, in Patent Literature 1, the word "page" is not the flash memory read/write unit, but rather signifies the physical storage area allocated in accordance with the higher-level capacity virtualization technology. Furthermore, in the present specification, the word "page" also signifies the physical storage area allocated in accordance with the higher-level capacity virtualization technology rather than the flash memory read/write unit. The flash memory read/write unit will be called a "segment" in this specification.

However, a storage system according to this present invention does not necessarily have to have the higher-level capacity virtualization technology. In addition, formatting is ordinarily performed using a specific pattern (for example, all 0's) prior to storing user data in a storage device. In Patent Literature 2, the page into which the specific pattern is written at formatting time is open. In Patent Literature 1, the storage system notifies the flash memory storage device of the all 0's write destination, and the flash memory storage device exercises control such that a block is not allocated to this write destination.

CITATION LIST

Patent Literature

PTL 1: WO 2011/010344
PTL 2: Japanese Patent Application Laid-open No. 2007-199922

SUMMARY OF INVENTION

Technical Problem

In a large-capacity storage system that uses flash memory as a storage medium, the number of flash memory chips will reach tens of thousands. For this reason, a typical configuration is one in which hundreds of flash packages equipped with hundreds of chips are coupled to the storage controller.

The problem that the present invention is to solve is to lessen the impact on the performance of the storage system as a whole, reduce the capacity of data stored in a flash memory, and store an apparently larger amount of data in a large-scale storage system comprising a large number of flash packages. Specifically, for example, this includes the following first and second problems.

The first problem is to lessen the impact on performance and reduce the capacity of stored data. Patent Literature 1 discloses (1) a capacity virtualization technology (a lower-level capacity virtualization technology), and (2) that a physical area is not allocated in a case where write-target data is a specific pattern. However, it is possible to further reduce the capacity of the stored data in a flash memory. Compression is a typical method for reducing the capacity of stored data. However, compression technology that makes the most of the characteristics of the flash memory to make it appear that a larger amount of data is being stored is not known.

The second problem will be explained. Generally speaking, the reduction ratio of data, like the compression ratio, will differ in accordance with the content of the data, and is difficult to predict. In Patent Literature 1, the flash package shows the storage controller a capacity that appears to be larger than the physical capacity (hereinafter, will be called the virtual capacity). However, there is no known technology for solving the problem that occurs in an event in which the compression ratio changes in accordance with data that has actually been stored, for example, the problem that occurs when the compression ratio is lower than expected.

Solution to Problem

The storage system comprises a plurality of flash packages, and a storage controller, which receives a write request from a host and sends write data conforming to this write request to a write-destination flash package. Each flash package comprises a plurality of flash chips. Each flash chip is formed from a plurality of blocks. The block is the data delete unit.

One characteristic feature of the present invention for solving the first problem is as follows. That is, the flash packages shows the controller inside the storage system a virtual capacity that is larger than the physical capacity, and, in addition, uses compression technology to compress the write data received from the storage controller so that the flash package is able to store a capacity that is larger than the physical capacity. The impact on performance can be held in check by making the most of the characteristics of flash memory.

As was already explained, when rewriting data in a flash memory, most often this data is not written to the area (for example, the area inside a block) where this data was originally stored, but rather, is written to a different area (for example, a different area inside the same block). When the same data is written to a plurality of areas and the block becomes full, a reclamation process is executed. For this reason, reducing this stored data capacity (the capacity of the data in the block) by compressing the data is not a problem since the data is written to a different area at data update. Furthermore, the stored update data capacity can also be reduced by compressing and writing the update data (the post-rewrite data). When the block gets full, the flash package may carry out a reclamation process. In the reclamation process, the flash package may extend the data one time, and after sorting the extended data, compress the sorted data, or may move the compressed data as-is.

As described above, according to the present invention, a compression process can be incorporated into the basic operations generally executed by a flash memory (for example, a write-once process (a process for writing the post-rewrite data of data stored in a certain area inside a block to a different empty area inside the same block (or an empty area inside a different block)) and a reclamation process). In accordance with this, a drop in performance caused by the compression process can be suppressed. Furthermore, since the frequency of reclamation processing will decrease when the compression ratio is high, in certain cases, compression may even enhance performance.

The second problem, that is, the specific problem of the occurrence of an event wherein the compression ratio changes in accordance with the data that has actually been stored, will be described. For example, when the compression ratio is lower than expected, an event occurs in which no more data can be stored in a flash package even though data is only being written to the flash package in a capacity that is smaller than the virtual capacity, which this flash package is showing to the storage controller. Alternatively, when the compression ratio is higher than expected, more empty capacity remains even though data of around the same capacity as the virtual capacity, which the flash package is showing to the storage controller, has been written to this flash package. Another characteristic feature of the present invention is a function which allows a flash package to use the compression ratio to dynamically change the virtual capacity shown to the controller. This function makes it possible to more efficiently reduce the capacity of the stored data.

The storage controller must have a function for dealing with a case in which the flash package sends a notification of a change in the virtual capacity. When realizing this function, it is preferable that the storage controller also have a capacity virtualization function (a higher-level capacity virtualization function). This is because the storage controller does not make the host aware of this virtual capacity change even though the flash package sends a notification of the virtual capacity change. The capacity virtualization function is a technique for showing the host the virtual storage capacity instead of the actual physical storage capacity possessed by the storage system. Therefore, the storage controller can keep the host in the dark about this change in the virtual capacity even though the flash package has notified the storage controller of this virtual capacity change. The storage controller, rather than the flash package, may also recognize the compression ratio and adjust the virtual capacity of the flash package.

Advantageous Effects of Invention

In a large-capacity storage system comprising a plurality of flash packages according to the present invention, it is possible to suppress performance degradation, reduce stored data capacity, and store data of a capacity that is larger than the physical storage capacity.

BRIEF DESCRIPTION OF DRAWINGS

FIG. 6 is a diagram showing the format of real page information in the example of the present invention.

FIG. 8 shows the format of flash package information in the example of the present invention.

FIG. 9 is a diagram showing the format of flash package group information in the example of the present invention.

DESCRIPTION OF EMBODIMENTS

Figure 1:
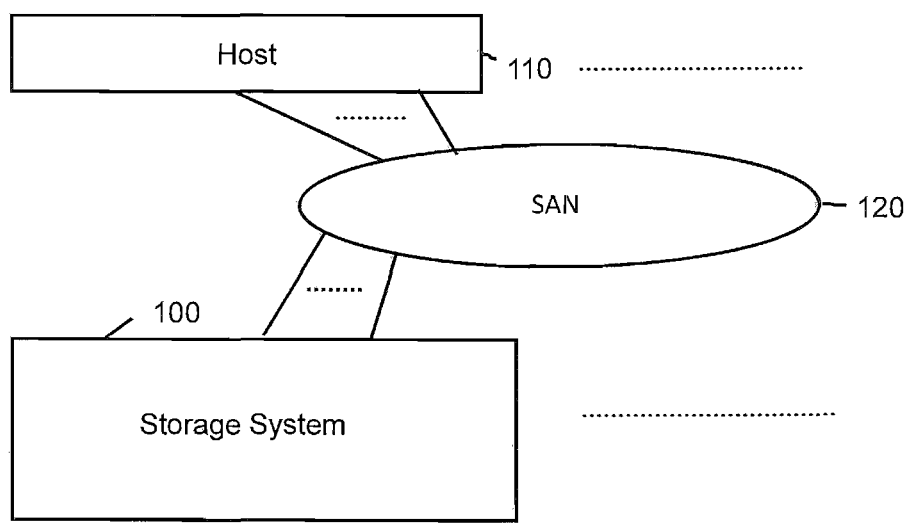
FIG. 1 is a diagram showing the configuration of an information system in an example of the present invention.

An example of the present invention will be explained below by referring to the drawings.

FIG. 1 shows the configuration of an information system in one embodiment of the present invention.

The information system comprises a storage system 100, a host 110, and a SAN (Storage Area Network) 120 coupling these components. The host 110 is a computer for executing an application program (a user application), and reads and writes required data back and forth to the storage system 100 via the SAN 120. The SAN 120 uses a protocol that is able to transfer an SCSI command. For example, a Fibre Channel or other such protocol can be used as this protocol. Besides the SCSI command, a mainframe I/O protocol can also be used.

In this example, technology for reducing the capacity of data stored in a flash memory (flash memory stored data capacity reduction technology) is realized in the storage system 100, which comprises a large number of flash memories. In this example, the storage system 100 has hierarchical capacity virtualization technology. The control unit of a higher-level capacity virtualization technology is called a page. A page in this example is used in the capacity virtualization technology realized in accordance with a storage controller 200. Furthermore, the present invention will be valid even when a higher-level control unit in the hierarchical capacity virtualization technology is not a page. In this example, the size of a page is larger than a block, which is the delete unit in the flash memory. For example, the size of the page is X-times the block size (where X is a whole number equal to or larger than 2). Since the read/write unit in a flash memory is normally called a page, the page is smaller than the block. However, as already explained, in this example, a page signifies the control unit with respect to the higher-level capacity virtualization technology (a storage area allocated to a virtual logical volume in accordance with thin provisioning), and the size thereof is larger than the block. Furthermore, in this example, the read/write unit in the flash memory will be called a "segment" to make a distinction with the page, which is the higher-level capacity virtualization control unit. Furthermore, the control unit of the lower-level capacity virtualization technology in this example will be explained as the $N^{th}$ (where N is a whole number equal to or larger than 1) unit of the block, which is the delete unit of the flash memory. The present invention will still be valid even when a capacity virtualization function, which makes a flash memory the storage medium, makes the virtual capacity larger than the real capacity, and makes a block, which is the delete unit, the allocation unit, is provided to the host 110 without a conventional higher-level capacity virtualization function.

Figure 2:
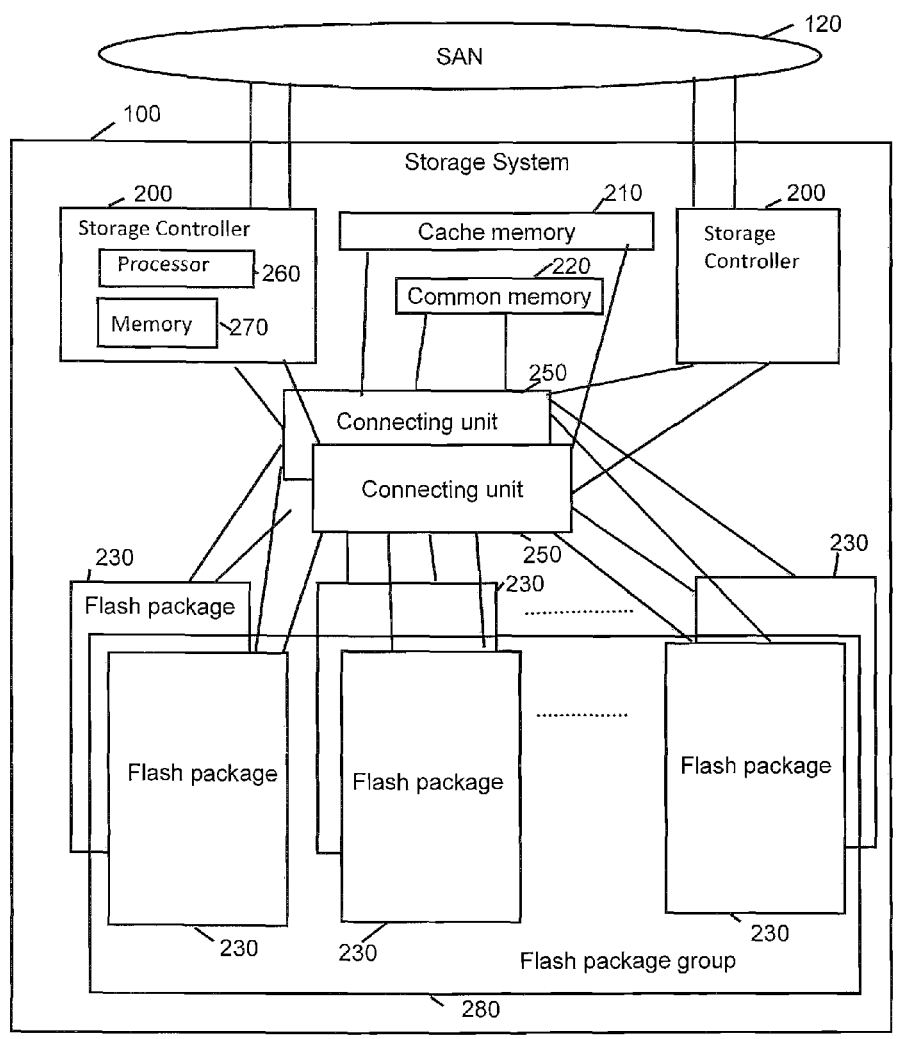
FIG. 2 is a diagram showing the configuration of a storage system in the example of the present invention.

FIG. 2 shows the configuration of the storage system 100. The storage system 100 comprises one or more storage controllers 200, a cache memory 210, a common memory 220, a flash package 230, and one or more connecting units 250 for coupling these components. Furthermore, in this example, the plurality of storage mediums inside the storage system 100 are all flash memories, but the storage system 100 may also comprise another type of storage medium, like a HDD, in addition to the flash memories. Also, the physical capacities (physical storage capacities) of all of the flash packages 230 are identical in this example. However, the physical capacities of at least two or more lash packages 230 of the plurality of flash packages 230 in the present invention may differ. The storage controller 200 comprises a processor 260 for processing either a read request or a write request issued from the host 110, and a storage resource (for example, a memory 270) for storing a program and/or information.

The connecting unit 250 is a mechanism for coupling the respective components inside the storage system 100. In this example, it is supposed that one flash package 230 is coupled to a plurality of storage controllers 200 in accordance with a plurality of connecting units 250 to increase reliability. However, the present invention will still be valid in a case where one flash package 230 is coupled to only one connecting unit 250.

At least one of the cache memory 210 and common memory 220 normally comprises a DRAM or other such volatile memory, but a battery or the like may be used to make this memory nonvolatile. However, the present invention will still be valid even when at least one of the cache memory 210 and common memory 220 is made nonvolatile.

The data among the data stored in the flash package 230, which is frequently accessed by the storage controller 200, is stored in the cache memory 210. The storage controller 200 receives a write request from the host 110, writes the data conforming to this write request (the data to be written to the flash package 230) to the cache memory 210, and completes this write request (for example, sends the host 110 a completion report with respect to the write request). However, the present invention will still be valid in a system which completes the write request at the stage when the write data has been stored in the flash package 230.

The common memory 220 stores cache memory 210 control information, important management information that is inside the storage system 100, information with respect to communications between the storage controllers 200, and at least one type of synchronized information.

Furthermore, in this example, it is supposed that the flash package 230 appears to be a single unit of the storage device from the standpoint of the storage controller 200. Therefore, it is supposed that the storage controller 200 is equipped with a RAID (Redundant Array of Independent (or Inexpensive) Disks) function that enables data to be recovered from a flash package 230 even when this flash package 230 fails. In a case where the storage controller 200 is equipped with a RAID function, a single RAID configuration can be adopted using a plurality of flash packages 230. This will be called a flash package group 280. However, the present invention will still be valid even when the storage controller 200 is not equipped with a RAID function like this.

Figure 3:
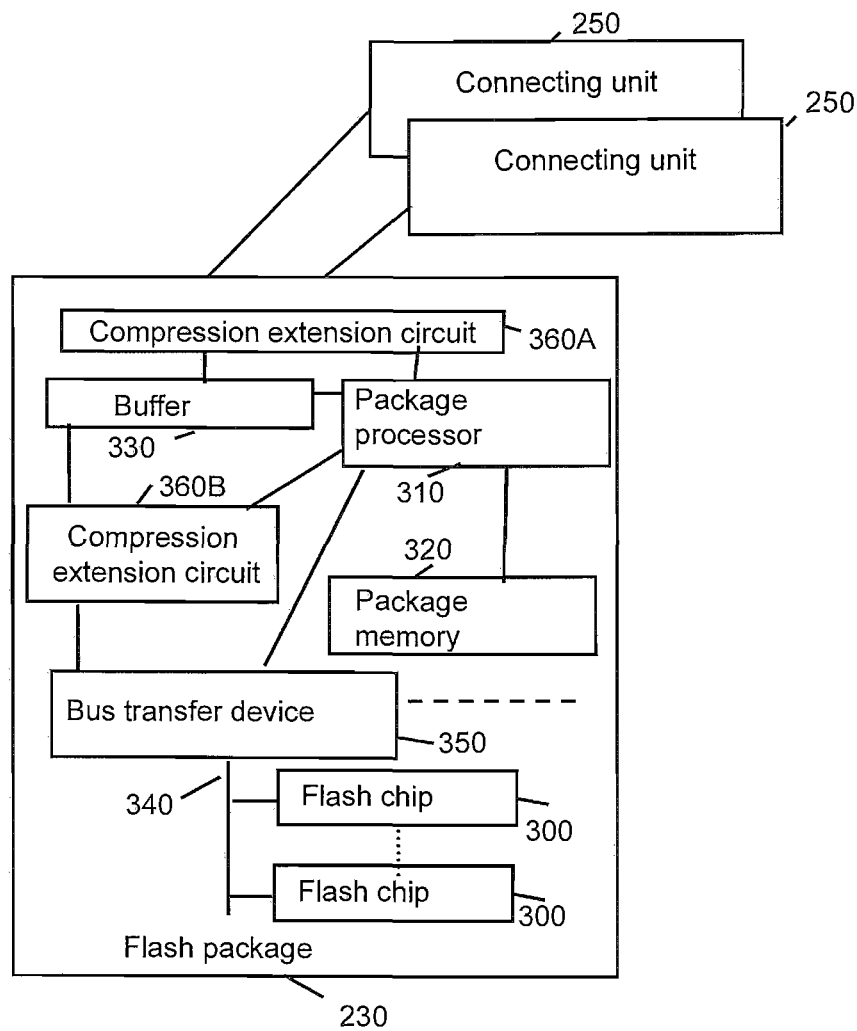
FIG. 3 is a diagram showing the configuration of a flash package in the example of the present invention.

FIG. 3 shows the configuration of the flash package 230. The flash package 230 comprises a plurality of flash chips 300, a package processor 310, a package memory 320, a buffer 330, a package bus 340, a bus transfer device 350, and a compression extension circuit 360. In this example, the flash package 230 has a block-unit capacity virtualization function. Furthermore, the present invention will still be valid even in a case where the flash package 230 has a function for virtualizing capacity in units other than blocks. For this reason, a capacity that is larger than the physical capacity of the flash package 230 (a value reflecting the total physical capacity of all the flash chips 300 of the flash package 230) is defined as the virtual capacity. Upon receiving a write request from the storage controller 200, the flash package 230 determines whether or not a block to which the data should be written has been allocated to the write-destination address (the virtual area to which this address belongs) conforming to this write request, and in a case where the result of this determination is negative, allocates a block to the write-destination address. This makes it possible to delay the time at which the block is actually allocated, thereby having the effect of reducing capacity.

Furthermore, two compression extension circuits 360A and 360B are provided. The first compression extension circuit 360A either compresses or extends the data to be transferred between the storage controller 200 and the buffer 330. The second compression extension circuit 360B either compresses or extends data to be transferred between the bus transfer device 350 and the buffer 330, and data that is to be read from a certain area of the buffer 330 and written to a different area of the buffer 330. In accordance with the above, it is possible to compress data stored in a flash chip 300, thereby having the effect of further reducing capacity. Also, in this example, in a case where there is no particular instruction (for example, a case in which there is no instruction from the package processor 310), the compression extension circuits 360A and 360B transfer the inputted data as-is without either compressing or extending this data.

The package processor 310 receives either a read request or a write request from the storage controller 200, and executes processing in accordance with the received request.

The buffer 330 stores the data that is to either be read or written between the storage controller 200 and the flash chip 300. In this example, the buffer 330 is a volatile memory. The package processor 310 receives a write request from the storage controller 200, and this write request is completed at the stage when the data conforming to this write request has been written to the flash chip 300 (write-request-complete is reported to the storage controller 200). However, the buffer 330 may be a nonvolatile memory, and the package processor 310 may send this write request completion report to the storage controller 200 at the stage when the data conforming to the write request from the storage controller 200 has been written to the buffer 330.

A program executed by the package processor 310 and flash chip 300 management information are stored in the package memory 320. Because the flash package 230 management information is important, it is preferable that the management information be able to be saved to a specific flash chip 300 during a planned stoppage. It is also preferable to have a battery in preparation for a sudden failure, and to use this battery so as to be able to save the management information to a specific flash chip 300 even when a failure or the like occurs.

The package bus 340 is for carrying data transferred between the buffer 330 and the flash chip 300, and one or more of these package buses 340 exist. A flash package 230 generally has a plurality of package buses 340 to improve performance, but the present invention will still be valid with just one package bus 340.

The bus transfer device 350 exists corresponding to the package bus 340, and executes a data transfer between the buffer 330 and the flash chip 300 in accordance with an instruction from the package processor 310.

The compression extension circuits 360A and 360B either compress or extend data to be read from the buffer 330 and/or data to be written to the buffer 330 in accordance with an instruction from the package processor 310. Of course, it is also possible for the compression extension circuits 360A and 360B to transfer data without either compressing or extending this data.

Figure 4:
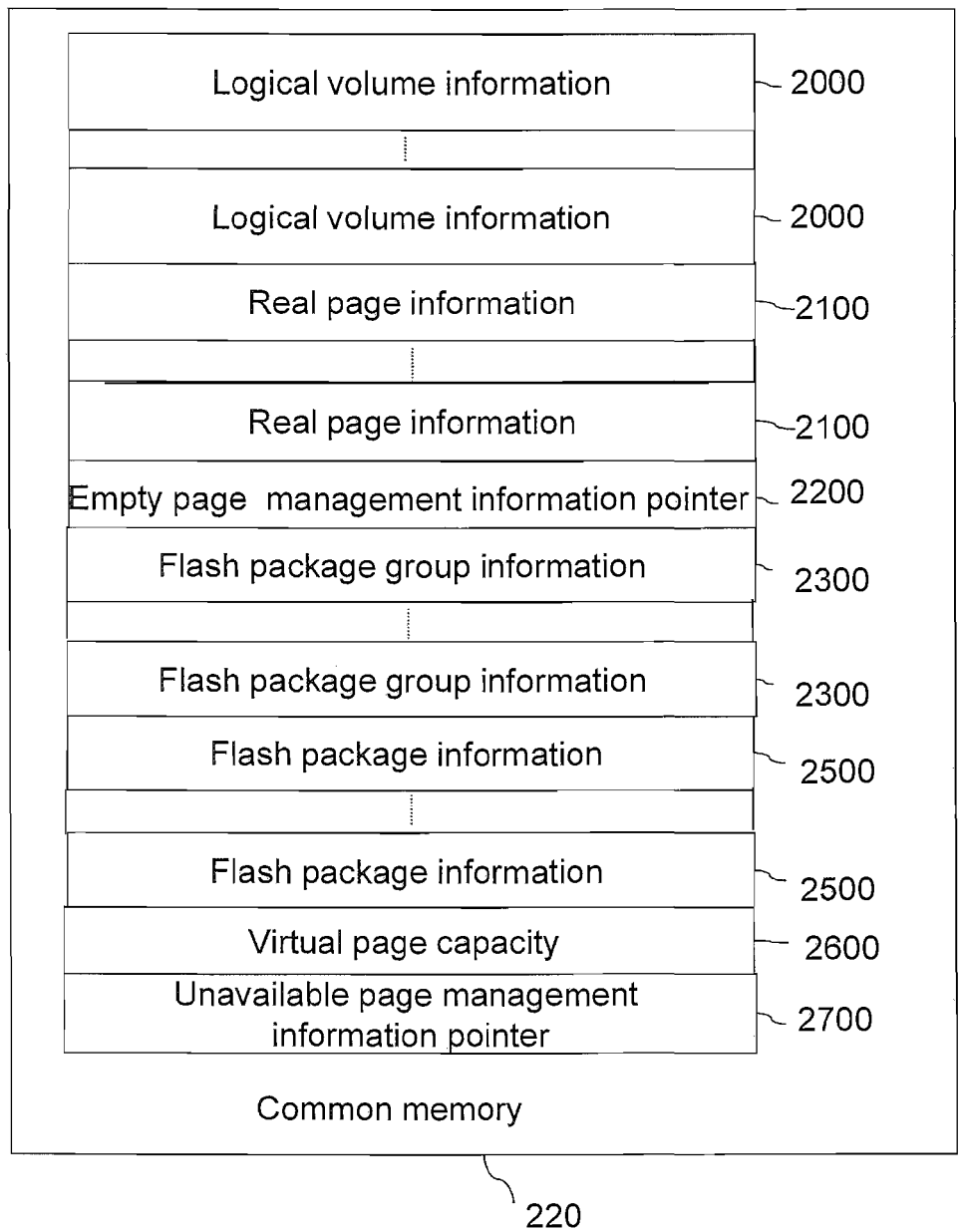
FIG. 4 is a diagram showing higher-level control-related information that is stored in a common memory of the storage system in the example of the present invention.

FIG. 4 shows information stored in the common memory 220 of the storage system 100.

Logical volume information 2000, real page information 2100, an empty page information management pointer 2200, flash package group information 2300, flash package information 2500, a virtual page capacity 2600, and an unavailable page information management pointer 2700 are stored in the common memory 220. At least one type of information among this information is used for realizing the higher-level capacity virtualization technology.

In this example, it is supposed that the storage controller 200 comprises a higher-level capacity virtualization function. However, the present invention will still be valid even in a case where the storage controller 200 does not have a higher-level capacity virtualization function. Normally, the storage area allocation unit in the higher-level capacity virtualization function is called a page. Furthermore, in this example, it is supposed that a logical volume (for example, a virtual logical volume in accordance with thin provisioning) is partitioned into a plurality of virtual pages (virtual storage areas), and a storage space (hereinafter may be called a "pool"), which is based on one or more flash package groups 280, is partitioned into a plurality of real pages (substantial storage areas). In capacity virtualization, the storage capacity of the logical volume can appear to be larger than the actual capacity. For this reason, the number of virtual pages is generally larger than the number of real pages. In a case where the capacity virtualization function has been realized, the storage controller 200 allocates an empty real page from the pool to the virtual page belonging to the write-destination address conforming to the write request from the host 110, and writes the data conforming to the write request to this real page.

The virtual page capacity 2600 is information denoting the capacity of the virtual page. However, in this example, the capacity of the virtual page and the capacity of the real page are not identical. This is because redundancy data that differs in accordance with the RAID type may be stored in the real page. Therefore, the capacity of the real page is decided by the RAID type of the flash package group 280 to which this real page has been allocated. For example, in a case where data is written in duplicate as in RAID 1, the capacity of the real page is two times the virtual page capacity. In a case where redundancy data with a capacity of one storage device is stored with respect to the capacity of N storage devices as in RAID 5, the real page capacity is a capacity of (N+1)/N of the virtual page capacity. One piece of redundancy data and the N pieces of data that make up this redundancy data will be called a "stripe group". In addition, the length of the individual pieces of data comprising the stripe group will be called a "stripe size". Naturally, when there is no redundancy as in RAID 0, a capacity equivalent to the virtual page capacity constitutes the capacity of the real page. Furthermore, in this example, the capacity of the virtual page is shared in common with respect to either one or a plurality of logical volumes (a virtual logical volume in accordance with thin provisioning) provided by the storage system 100, but the present invention will still be valid even when a different capacity virtual page is included in the one or plurality of virtual volumes.

Figure 5:
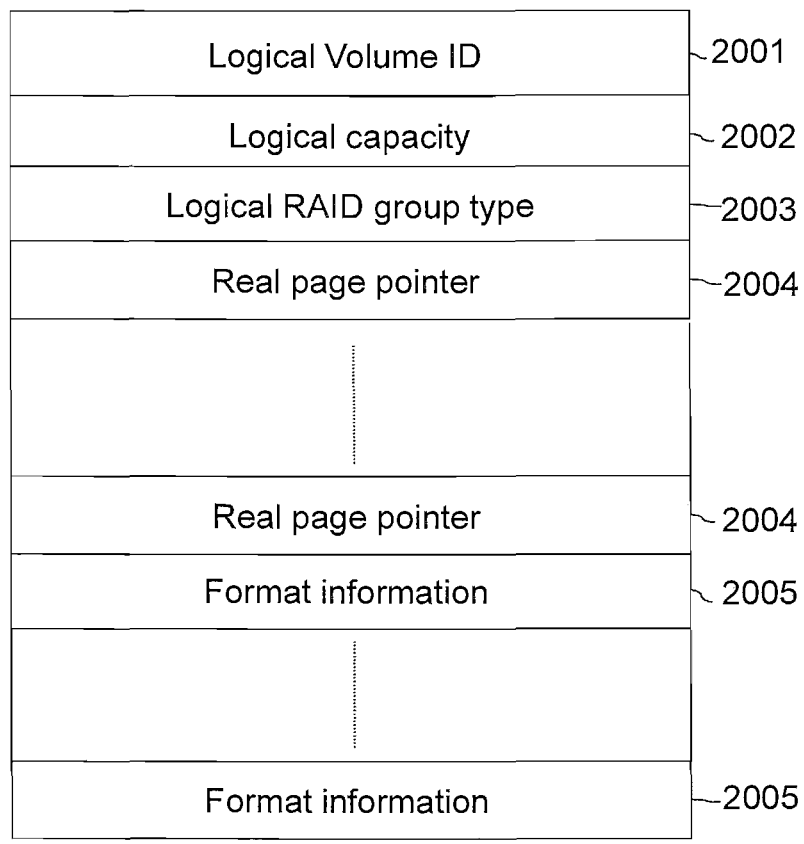
FIG. 5 is a diagram showing the format of logical volume information in the example of the present invention.

FIG. 5 shows the format of logical volume information 2000.

The logical volume is a logical storage device in which data either read or written by the host 110 is stored. Generally speaking, the host 110 issues a read request or a write request by specifying a logical volume ID, an address inside the logical volume, and the length of the data to be read or written. The logical volume information 2000 exists for each logical volume. This information comprises a logical volume ID 2001, a logical capacity 2002, a logical volume RAID type 2003, a real page pointer 2004, and format information 2005.

The logical volume ID 2001 denotes the ID of the corresponding logical volume.

The logical capacity 2002 denotes the capacity of the corresponding logical volume as seen from the host 110.

The logical volume RAID type 2003 denotes the RAID type of the corresponding logical volume (for example, RAID 0, RAID 1, and so forth). It is supposed that a specific numeric value N is specified in a case where redundancy data is stored in one flash package 230 with respect to N flash packages 230 as in RAID 5. However, it is not possible to specify an arbitrary RAID type, and at least one flash package group 280 must have the RAID type.

The real page pointer 2004 is the pointer to management information 2100 of a page that has been allocated to a virtual page of the corresponding logical volume. The number of real page pointers 2004 is the number of virtual pages of the logical volume (a number obtained by dividing a value denoting the logical capacity 2002 by a value denoting the virtual page capacity 2600, and in the case of a remainder, 1 is added to the quotient). The page corresponding to the initial real page pointer 2004 is the real page that has been allocated to the first virtual page of the logical volume, and thereafter, a pointer corresponding to the real page to be allocated to the next virtual page is stored in the next real page pointer 2004. Furthermore, since the present invention supports a virtual capacity function, the allocation of the real page is not defined by the logical volume, but rather is triggered by a data write actually being carried out to the corresponding virtual page. Therefore, in the case of a virtual page for which a write has yet to be carried out, the corresponding real page pointer 2004 will be NULL.

The format information 2005 also exists corresponding to the virtual page of the corresponding logical volume. The host 110 most often initializes a storage medium using specific information prior to storing data to be used by an application program. In a case where the storage system 100 has recognized the fact that cyclic information (for example, the repetition of short format information) has been written to the virtual page in accordance with a write request, the storage system 100 may release the real page allocated to this virtual page by recording information denoting that format data has been written in the format information 2005 corresponding to this virtual page. Or, in a case where the host 110 issues a write same command to write cyclic information (a repetitive pattern) to an explicitly specified area and the storage system 100 receives the write same command, storing the cyclic information in the format information 2005 makes it possible to recognize that this cyclic information is being stored in this virtual page, thereby enabling the real page allocated to this virtual page to be released. The storage system 100, upon receiving the write same command, may also transfer this request to the lower-level capacity virtualization function and have the flash package 230 perform the release in block units. The capacity reduction effect can be expected in accordance with this. Or, more specifically, in a case where the host 110 issues a request to release this area, the storage system 100 may execute the same processing. Similarly, in a case where a format pattern such as all 0's has been written in accordance with a normal write command, the storage system 100 recognizes this format pattern and may have the lower-level capacity virtualization function release the corresponding block. Since there is no need to allocate a real page to this virtual page in a case where the format information 2005 has been configured, the real page pointer 2004 will constitute a NULL value. When data other than the information stored in the format information 2005 is written to the corresponding virtual page, a real page is allocated and the format information 2004 becomes NULL.

FIG. 6 is the format of the real page information 2100.

The real page information 2100 is real page management information, which exists for each real page. The real page information 2100 comprises a package group 2101, a real page address 2102, an empty page pointer 2103, an amount of stored page data 2104, an amount of compressed and stored page data 2105, a moving state flag 2109, a transfer to real page pointer 2110, and a waiting state for transferring 2111.

The package group 2101 shows the flash package group 280 to which the corresponding real page is allocated.

The real page address 2102 is information showing the relative address inside the flash package group 280 constituting the basis for the corresponding real page to which the corresponding real page is allocated.

The empty page pointer 2103 constitutes a valid value in a case where a virtual page is not allocated to the corresponding real page. In this case, this value points to the next empty page information 2100 for which the virtual page is not allocated. In a case where the virtual page is allocated, the empty page pointer 2103 becomes a NULL value.

In this example, each flash package 230 is equipped with a capacity virtualization function, and provides the storage controller 200 with capacity that appears to be larger than the actual physical capacity. The unit for capacity virtualization in the flash package 230 in this example is the block, which is the delete unit of the flash memory. Below, the block seen from the storage controller 200 may be called a "virtual block" and the block actually allocated by the flash package 230 may be called a "real block". Therefore, in this example, the real page is configured from either one or a plurality of virtual blocks. Furthermore, in this example, the capacity space configured by the virtual block is larger than the capacity space configured by the real block.

Figure 7:
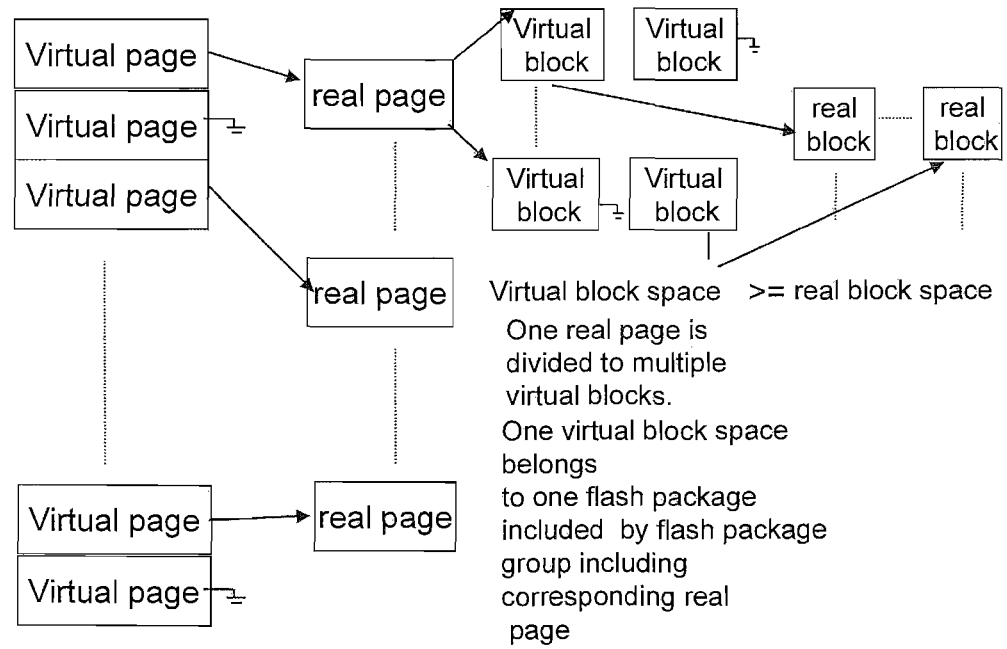
FIG. 7 is a diagram depicting the relationship of a virtual page, a real page, a virtual block, and a real block in the example of the present invention.
Figure 7:
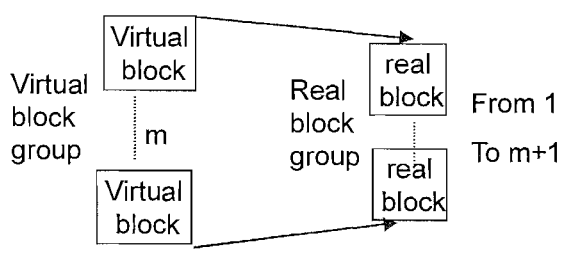

FIG. 7 shows the relationships between the virtual page, the real page, the virtual block and the real block.

As already explained, redundancy data not found in the virtual page is stored in the real page. Meanwhile, data stored in the virtual block is compressed, and the compressed data is stored in the real block. In this example, the data of m (where m is a whole number equal to or larger than 1) virtual blocks is stored in between 1 and (m+1) real blocks in accordance with the compression ratio. However, the present invention is still valid even in a case where the above storage system is not adopted. Below, these m virtual blocks may be called a "virtual block group", and the one or more real blocks allocated to a single virtual block group may be called a "real block group". The reason for making (m+1) the maximum number of allocated real blocks in this example will be explained below. Hypothetically, it is supposed that most of the data stored in the virtual block group could not be compressed. In this case, the number of real blocks required will be m, but there will be practically no empty capacity in the real block. It is supposed that the flash package 230 has received a request (a normal write request) to rewrite a portion of the data inside the block from the storage controller 200 at this time. Since the flash memory block cannot be rewritten, the flash package 230 must read all of the data in this block to the buffer 330, update the rewrite part only, delete the pertinent block one time, and thereafter store the data in the entire block. Executing the above operation each time the flash package 230 receives a write request results in excessively long processing times and cannot be called practical. To solve for this, in this example, one more real block is allocated, an empty area is secured, and an additional write is carried out to the empty area. In a case where the empty area is too small to accommodate the rewrite data, a delete process (a process for deleting the block data) is carried out. This makes it possible to improve performance since the delete process may be executed one time for every n write requests. Furthermore, reducing the number of delete processes also increases the life of the flash memory. In this example, the flash package 230 makes it appear to the storage controller 200 that there are more virtual blocks than real blocks. However, in the present invention the storage controller 200 is aware of how many empty real blocks the flash package 230 actually has, and reallocates a real page. In this example, in a case where the flash package 230 has received from the storage controller 200 a write request specifying an address that belongs to a virtual block to which a real block is not allocated, a real block can be allocated to this virtual block.

The amount of stored page data 2104 and the amount of compressed and stored page data 2105 are each in proportion to the number of flash packages 230 configuring the flash package group 280 that form the basis for the relevant real page (that is, each real page may be a storage area based a plurality of flash packages 230 configuring a flash package group 280). However, this information is not attribute information of the virtual block(s) included in this real page, but rather is attribute information related to the data of the virtual page corresponding to this real page. Therefore, in a case where this virtual page is allocated to a different real page and the data of the current real page is copied to the new real page, the amount of stored page data 2104 and the amount of compressed and stored page data 2105 are inherited as the management information of the new real page. The amount of stored page data 2014 is the amount of data stored in the relevant real page. The amount of compressed and stored page data 2105 is the amount of compressed data stored in the relevant real page. The above two values (amounts of data) are computed based on information received from the flash package 230.

The moving state flag 2109, the transfer to real page pointer 2110 and the waiting state for transferring 2111 are information used when the data of the relevant real page is transferred to another real page. The moving state flag 2109 is ON when the data of this real page is being transferred to the other real page. The transfer to real page pointer 2110 is information denoting the address of the transfer-destination real page to which the data of this real page is being transferred. The waiting state for transferring 2111 is a flag that is ON when the decision to transfer the data inside the target real page has been made.

FIG. 8 is the format of the flash package information 2500.

The flash package information 2500 exists for each flash package 230. The flash package information 2500 comprises a flash package ID 2501, a flash package virtual capacity 2502, and a virtual block capacity 2503.

The flash package ID 2501 is the identifier of the relevant flash package 230.

The flash package virtual capacity 2502 denotes the virtual capacity of the relevant flash package 230.

The virtual block capacity 2503 is the capacity of the virtual block. A value obtained by dividing the value denoting the flash package virtual volume 2502 by the value denoting the virtual block capacity 2503 constitutes the number of virtual blocks based on this flash package 230. In this example, the value denoting this flash package virtual capacity 2502 is adjusted in accordance with the compression ratio of the flash package 230. As already explained, in this example, the flash package 230 determines the virtual capacity of this package 230, but this virtual capacity may be determined by the storage controller 200. When a notification to the extent that the virtual capacity has changed is received from the flash package 230, the storage controller 200 sets this value in the flash package virtual capacity 2502.

FIG. 9 shows the format of the flash package group information 2300.

The flash package group information 2300 exists for each flash package group 280. The flash package group information 2300 comprises a flash package group ID 2301, a package group RAID type 2302, a number of real pages 2303, a number of empty real pages 2304, a flash package pointer 2305, and a number of unavailable real pages 2306.

The flash package group ID 2301 is the identifier of the relevant flash package group 280.

The package group RAID type 2302 is the RAID type of the relevant flash package group 280. The RAID types in this example are the same as those described when explaining the logical volume RAID type 2003.

The number of real pages 2303 denotes the number of real pages based on the flash package group 280. The number of empty real pages 2304 denotes the number of empty real pages (empty real pages) among the plurality of real pages based on the flash package group 280. The number of unavailable real pages 2306 denotes the number of unavailable real pages among the plurality of real pages based on the flash package group 280. As already explained, one characteristic features of this example is the fact that the flash package 230 virtual capacity changes in accordance with the compression ratio. When the virtual capacity of the flash package 230 changes, the number of real pages 2303 and the number of empty real pages 2304 also change. This will be explained below. First, when the virtual capacity of the relevant flash package 230 changes, the number of real pages of the relevant flash package group 280 also changes. This will be described in concrete terms. First, based on the thinking behind RAID, the premise is that the available capacity is identical in the flash packages 230 inside the same flash package group 280. Consequently, the equation becomes:

Number of real pages 2303=(smallest flash package virtual capacity 2502 of flash packages 230 in flash package group 280)*(number of flash packages 230 in flash package group 280)/(real page size)

Therefore, in a case where the smallest flash package virtual capacity 2502 of the flash packages 230 in the relevant flash package group 280 has changed, the number of real pages 2303 also changes. Similarly, the number of empty real pages 2304 will also change. Since this also results in the number of real pages that are unavailable being changed, the number of unavailable real pages 2306 also changes. For example, in a case where the number of real pages 2303 increases by 10, the number of empty real pages 2304 also increases by 10 and the number of unavailable real pages 2305 decreases by 10. Furthermore, as already explained, in this example, the flash package 230 determines this capacity, but the storage controller 200 may make this determination.

The flash package pointer 2305 is the pointer to the flash package information 2500 of the flash package(s) 230 belonging to the relevant flash package group 280. The number of package pointers 2305 is the number of flash packages 230 that belong to the relevant flash package group 280, but this value is one that is decided in accordance with the package group RAID type 2302.

The empty page information management pointer 2200 shown in FIG. 4 is information provided for each flash package group 280.

Figure 10:
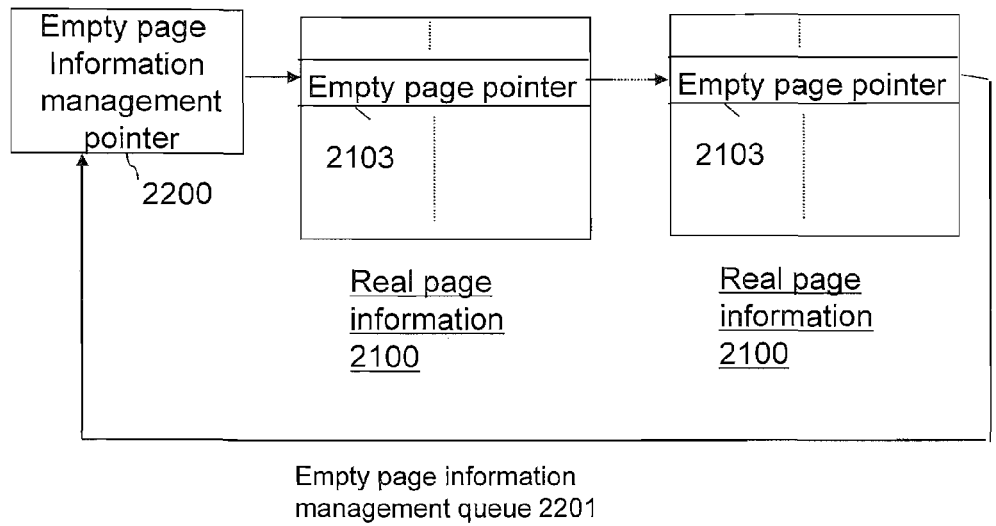
FIG. 10 is a diagram denoting a collection of empty real page information pointed to by an empty page information management pointer in the example of the present invention.

FIG. 10 denotes a collection of empty pages managed by the empty page information management pointer 2200.

The structure of this pointer 2200 is called the empty real page information queue 2201. Empty real page signifies a real page (an empty real page in a virtual page) that has not been allocated to a virtual page. Furthermore, the real page information 2100 corresponding to the empty real page is called the empty real page information 2100. The empty real page information management pointer 2200 is the pointer to the address at the head of the empty real page information 2100. Next, the empty page pointer 2103 inside the first real page information 2100 points to the next empty real page information 2100. In FIG. 9, the empty page pointer 2103 of the final empty real page information 2100 shows the empty page information management pointer 2200, but this may be a NULL value. The storage controller 200, upon receiving a write request with respect to a virtual page to which a real page has not been allocated, uses the empty page information management pointer 2200 to search for an empty real page within any flash package group 280 having the same RAID type as the logical volume RAID type 2003, for example, the flash package group 280 having the largest number of empty real pages, and allocates the detected empty real page to the virtual page.

The unavailable real page information management pointer 2700 shown in FIG. 4 is information provided for each flash package group 280.

Figure 11:
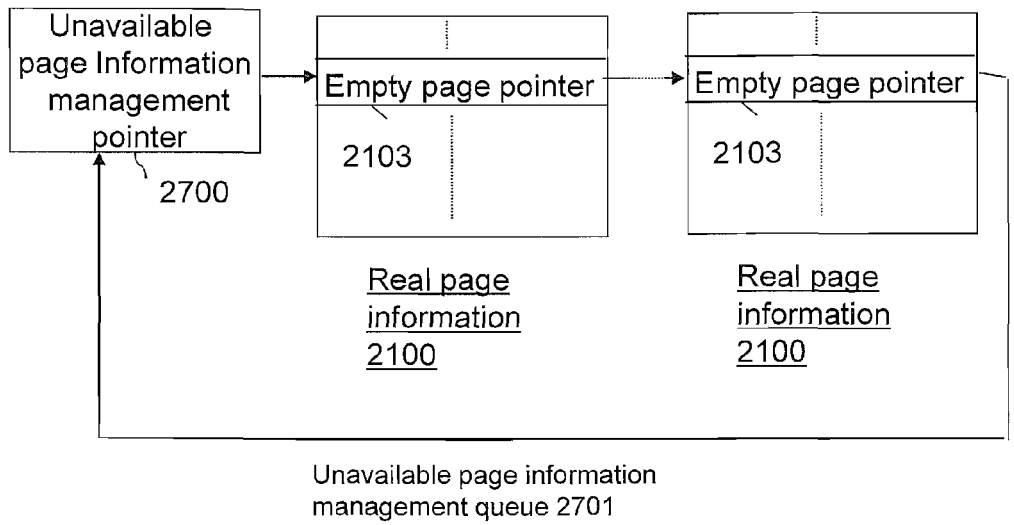
FIG. 11 is a diagram denoting a collection of unavailable real page information pointed to by an unavailable page information management pointer in the example of the present invention.

FIG. 11 denotes a collection of unavailable real pages managed by the unavailable real page information management pointer 2700.

The structure of this pointer 2700 is called the unavailable real page information management queue 2701. This structure is the same as the empty real page information management queue 2201. In a case where the virtual capacity of the flash package 230 has lessened and the number of the number of real pages 2303 has decreased, real page information 2100 managed by the empty real page information management queue 2201 is transferred to the unavailable real page information management queue 2701 in proportion to this number. By contrast, in a case where the virtual capacity of the flash package 230 has grown and the number of the number of real pages 2303 has increased, real page information 2100 managed by the unavailable real page information management queue 2701 is transferred to the empty real page information management queue 2201 in proportion to this number. In this example, the storage controller 200 is equipped with a higher-level capacity virtualization function, and the flash package 230 is equipped with a lower-level capacity virtualization function. For this reason, even when the virtual capacity of the flash package 230 changes, the storage controller 110 may simply use the already explained method to transfer the real page information 2100. In a case where the real page information 2100 has been associated with the unavailable real page information management queue 2701, the real page corresponding to this information 2100 is unable to be allocated to a virtual page and the virtual block(s) comprising this real page become inaccessible. For this reason, a real block can be allocated to another virtual block. That is, the real block can be used effectively.

Next, the management information of the flash package 230 will be explained. The flash package 230 holds the management information inside the package memory 320.

Figure 12:
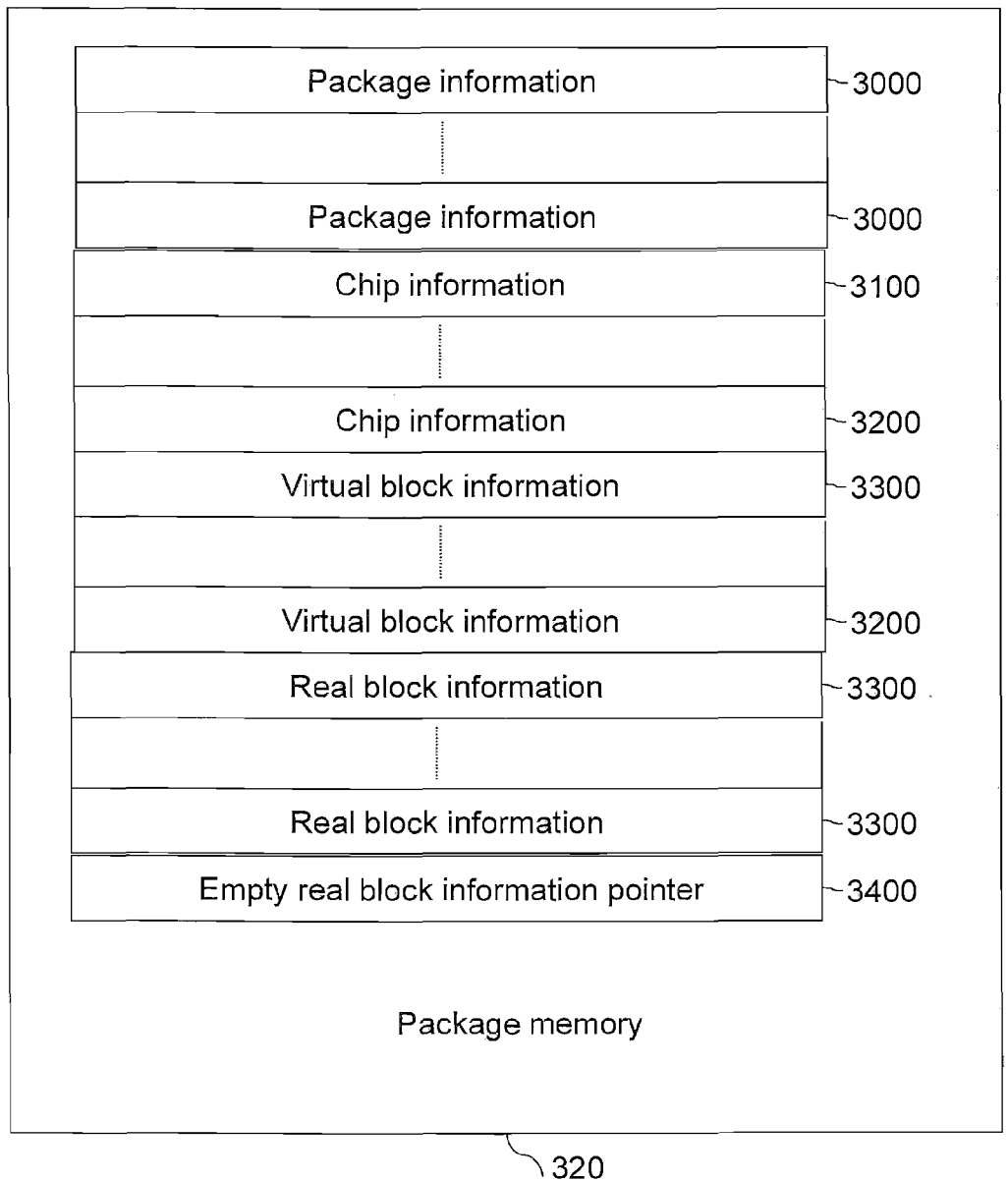
FIG. 12 is a diagram showing information for a lower-level tier inside a package memory of a flash package in the example of the present invention.

FIG. 12 shows the management information stored in the package memory 320.

Figure 13:
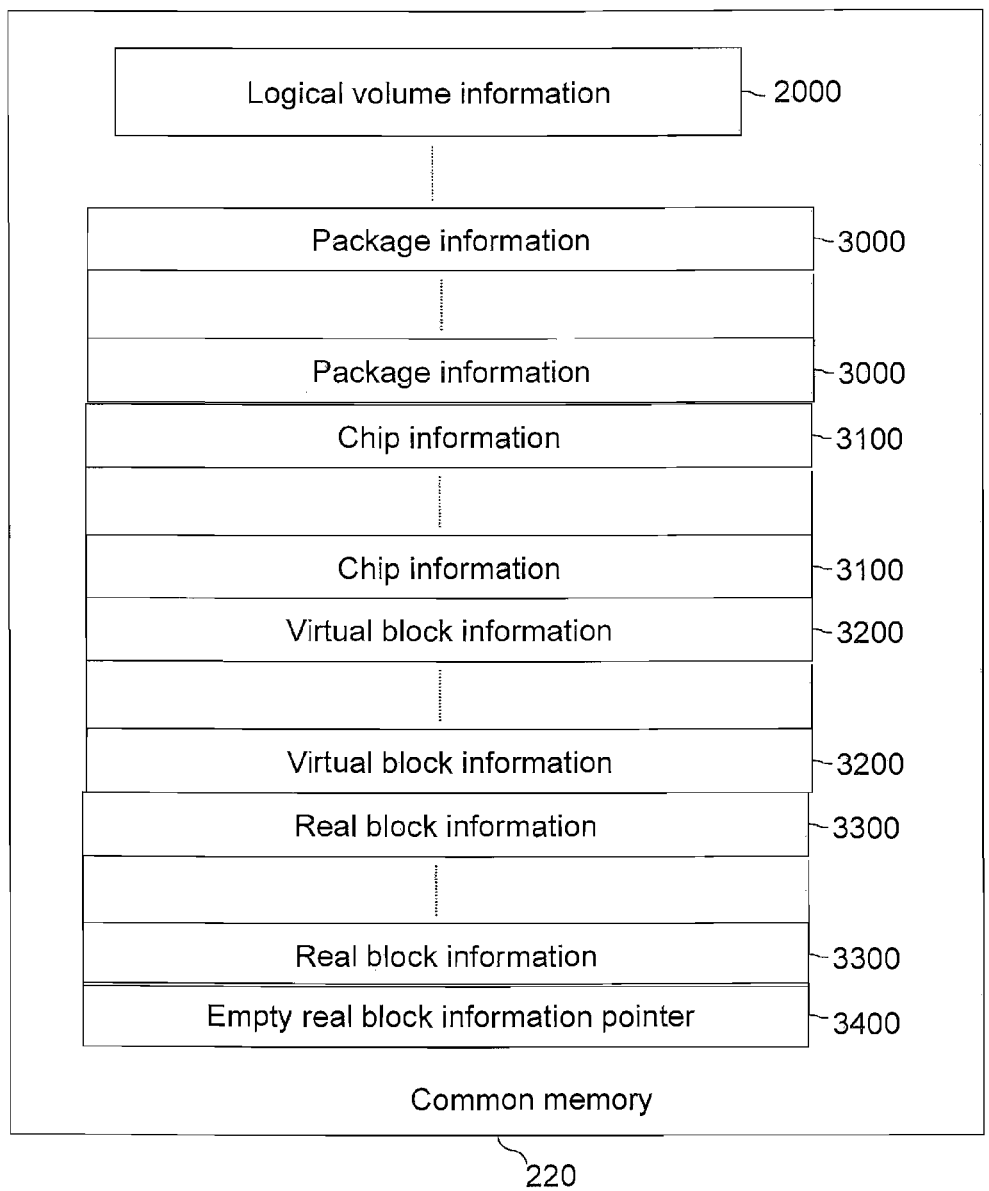
FIG. 13 is a diagram showing a configuration in which information for controlling the lower-level tier is disposed in the common memory of the storage system.

Package information 3000, chip information 3100, virtual block information 3200, real block information 3300, and an empty real block information pointer 3400 are stored in the package memory 320. At least one type of information from among this information is used for realizing the lower-level capacity virtualization technology and/or the compression technology. In this example, the flash package 230 realizes the lower-level capacity virtualization technology and the compression technology. However, in the present invention, the storage controller 200 may realize the lower-level capacity virtualization technology and the compression technology. In accordance with this, as shown in FIG. 13, substantially the same information as the information shown in FIG. 12 is stored in the common memory 220. In the configuration shown in FIG. 13, since the information shown in FIG. 13 is referenced and updated by the storage controller 200, this information will differ slightly from the respective information shown in FIG. 12. Therefore, in this example, it is supposed that the flash package 230 realizes the lower-level capacity virtualization technology and the compression technology.

Figure 14:
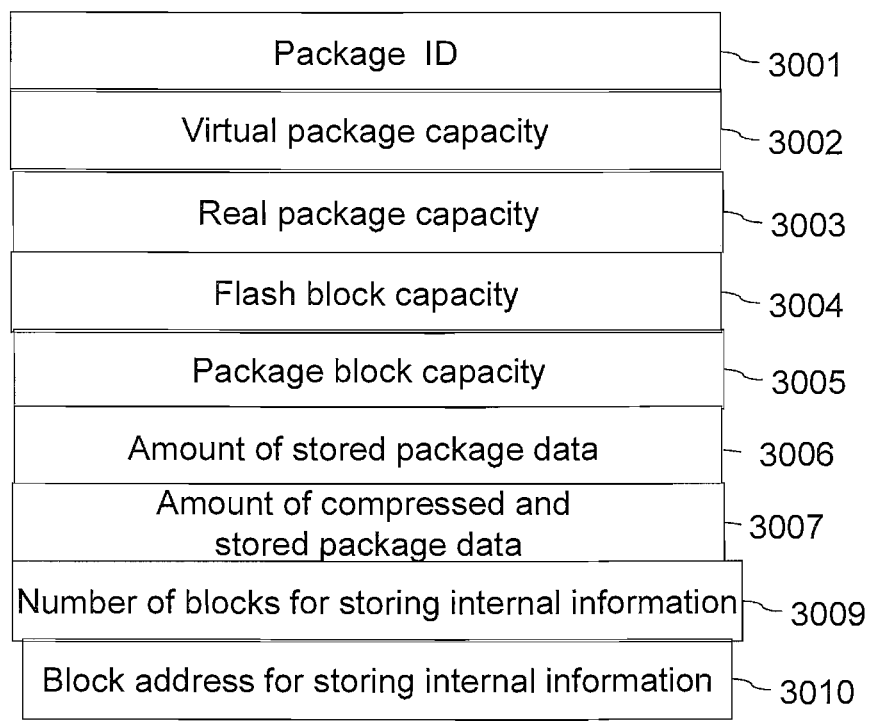
FIG. 14 is a diagram showing the format of package information in the example of the present invention.

FIG. 14 is the format of the package information 3000.

The package information 3000 comprises a package ID 3001, a virtual package capacity 3002, a real package capacity 3003, a flash block capacity 3004, a package block capacity 3005, an amount of stored package data 3006, an amount of compressed and stored package data 3007, a number of blocks for storing internal information 3009, and a block address for storing internal information 3010.

The package ID 3001 is the identifier of the relevant flash package 230.

The virtual package capacity 3002 denotes the virtual capacity of the relevant flash package 230 as seen from the storage controller 200. One characteristic feature of this example is the fact that the flash package 230 adjusts this virtual capacity in accordance with a change in the compression ratio. As explained already, this adjustment may be carried out by the storage controller 200.

The real package capacity 3003 denotes the physical capacity of the relevant flash package group 280, specifically, the capacity that enables the storage controller 200 to actually physically store data inside the relevant flash package group 280.

The flash block capacity 3004 denotes the physical capacity of the block, which is the delete unit of the flash memory.

The package block capacity 3005 denotes the capacity of a real block in the flash package 230.

The amount of stored package data 3006 denotes the total pre-compression value of write data received from the storage controller 200.

The amount of compressed and stored package data 3007 denotes the total post-compression value of write data received from the storage controller 200.

The number of blocks for storing internal information 3009 is the number of blocks constituting the save-destination of the internal information (for example, the information comprising the package information 3000, the chip information 3100, the virtual block information 3200, the real block information 3300, and the empty real block information pointer 3400 stored in the package memory 320). The internal information, for example, is stored either when the power is turned OFF or when a failure occurs.

The block address for storing internal information 3010 denotes the address of the storage area in which the internal information is stored (the address of the storage area in the package memory 320). Important information (for example, the package information 3000, the chip information 3100, the virtual block information 3200, the real block information 3300, and the empty real block information pointer 3400) may be stored n times. Also, since save operations are not that numerous, the number of times a block is deleted may cease to be a problem.

Information denoting the total number of real blocks possessed by the relevant flash package 230 may be included in the package information 3000. For example, in addition to the number of blocks for storing internal information 3009, information denoting the number of blocks capable of being allocated from the flash package 230 and the number of failed block based on the flash package 230 may also be included in the package information 3000.

Figure 15:
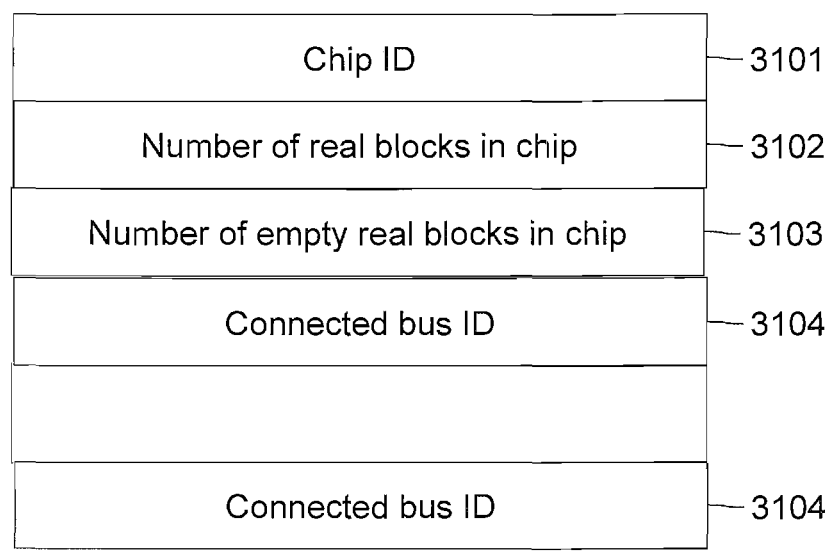
FIG. 15 is a diagram showing the format of chip information in the example of the present invention.

FIG. 15 is the format of the chip information 3100.

The chip information 3100 exists for each flash chip 300. The chip information 3100 comprises a chip ID 3101, a number of real blocks in chip 3102, a number of empty blocks in chip 3103, and a connected bus ID 3104.

The chip ID 3101 is the identifier of the relevant flash chip 300.

The number of real blocks in chip 3102 denotes the number of real blocks possessed by the relevant flash chip 300.

The number of empty blocks in chip 3103 shows the number of empty real blocks inside the relevant flash chip 300. The empty real block is a real block that has not been allocated to a virtual block (a real block capable of being allocated to a virtual block).

The connected bus ID 3104 is the identifier of the package bus 340 to which the relevant flash chip 300 is coupled.

Figure 16:
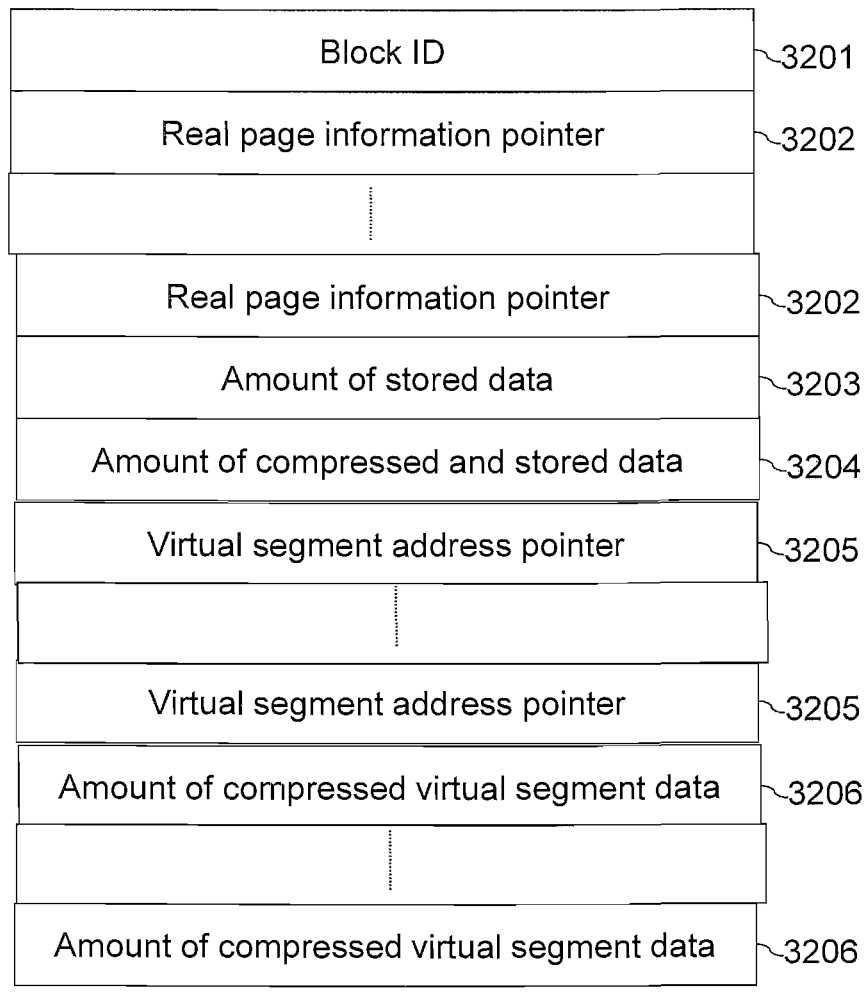
FIG. 16 is a diagram showing the format of virtual block information in the example of the present invention.

FIG. 16 is the format of the virtual block information 3200.

The virtual block information 3200 exists for each virtual block group. It is supposed that the virtual block information 3200 is in virtual block address order. The initial virtual block information 3200 corresponds to m virtual blocks from the first virtual block. The virtual block information 3200 comprises a virtual block group identifier 3201, a real block information pointer 3202, an amount of stored data 3203, an amount of compressed and stored data 3204, a virtual segment address pointer 3205, and an amount of compressed virtual segment data 3206. In this example, the flash memory read/write unit is called a "segment". The flash memory read/write unit is normally called a page, but in this example, the page is the unit for capacity virtualization, which is performed by the storage controller 200, and as such, the flash memory read/write unit is called the "segment" to avoid confusion. In this example, data written to the flash memory is compressed, and the compressed data is stored in the flash memory. The flash memory segment in which the compressed data is stored may be called the "real segment". A pre-compression virtual segment may be called a "virtual segment". In this example, one or more virtual segments are stored in a compressed real segment.

The virtual block identifier 3201 is the identifier of the corresponding virtual block group.

The real block information pointer 3202 is the pointer to the real block information 3300 of the real block allocated to a virtual block in the corresponding virtual block group. There are (m+1) real block information pointers 3202. The real block information pointer 3201 is a NULL value when the real block has not been allocated. In a case where there are k (where k is equal to or less than (m+1) real blocks allocated to the relevant virtual block group, k real block information pointers 3202 from the start are valid.

The amount of stored data 3203 denotes the amount of pre-compression data stored in the relevant virtual block group. The maximum capacity is the capacity of the virtual block group. The amount of compressed and stored data 3204 is the amount of compressed data stored in the relevant virtual block group. Furthermore, in the case of a flash memory, when the content of a virtual segment is rewritten, the same virtual segment data resides in a plurality of locations since the rewritten content is stored in a different real block. The amount of stored data 3203 and the amount of compressed and stored data 3204 are both values computed based on the most recent amount of data stored in the virtual segment.

The virtual segment address pointer 3205 denotes an identifier showing the location of the information within the real block information 3300 corresponding to the real block, which the corresponding virtual segment allocated to the relevant virtual block group, and a pointer showing the address inside this real block in which the information is stored. The amount of compressed virtual segment data 3206 denotes the amount of compressed data of the corresponding virtual segment. Furthermore, in this example, the virtual segment address pointer 3205 and the amount of compressed virtual segment data 3206 exist for each virtual segment, but the present invention will still be valid even in a case where at least one of the information 3205 and 3206 exists for each of two or more virtual segments.

Figure 17:
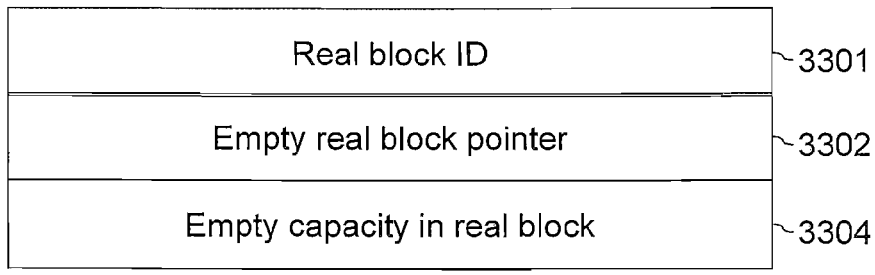
FIG. 17 is a diagram showing the format of real block information in the example of the present invention.

FIG. 17 is the format of the real block information 3300.

The real block information 3300 exists for each real block. The real block information 3300 comprises a real block identifier 3301, an empty real block pointer 3302, and an empty capacity in real block 3304.

The real block identifier 3301 is the identifier of the corresponding real block, and, for example, shows the address of the flash chip 300 to which this real block corresponds.

The empty real block pointer 3302, in a case where the corresponding real block is not allocated to a virtual block (is in an empty state), points to the real block management information 3300 of the next empty real block.

The empty capacity in real block 3304 shows the current empty capacity of the corresponding real block. The package processor 310 can store write data of equal to or less than the empty capacity in the corresponding real block. After storing the write data, the package processor 310 reduces the empty capacity in real block 3304 in proportion to the amount of write data that was stored.

Figure 18:
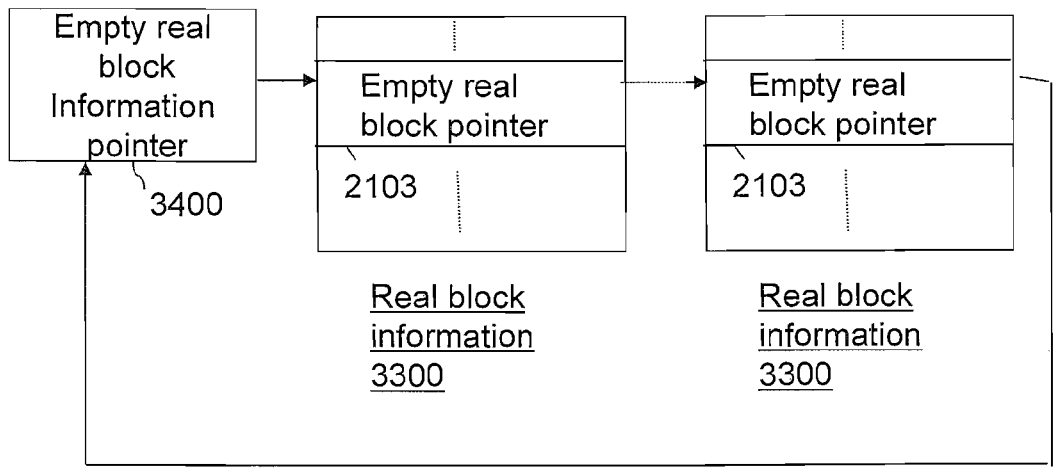
FIG. 18 is a diagram depicting a collection of empty real blocks pointed to by an empty block information pointer in the example of the present invention.

The empty real block information pointer 3400 exists corresponding to the flash chip 300. FIG. 18 denotes a collection of empty real blocks managed by the empty real block information pointer 3400. The empty real block information pointer 3400 points to the real block information 3300 address of the first empty block. Next, the empty block pointer 3302 inside the real block information 3300 of the first empty real block shows the real block information 3300 of the next empty real block. In FIG. 18, the empty real block pointer 2103 of the real block information 3300 of the last empty real block shows the empty real block information pointer 3400, but this may be a NULL value. The package processor 310, upon receiving from the storage controller 200 a write request specifying an address belonging to a virtual block to which a real block has not been allocated, searches for an empty real block among the real blocks inside the flash chip 300 (based, for example, on the empty real block information pointer 3400 corresponding to the flash chip 300 having the largest number of empty real blocks), and allocates the empty real block that has been found to the virtual block. The package processor 310 writes the data conforming to the above-mentioned received write request to the allocated empty real block.

Next, the operations executed by the storage controller 200 and the flash package 230 using the management information explained hereinabove will be explained.

First, the operation of the storage controller 200 will be explained. Storage controller 200 operations are executed by the processor 260 inside the storage controller 200, and the programs for these operations are stored inside the memory 270.

Figure 19:
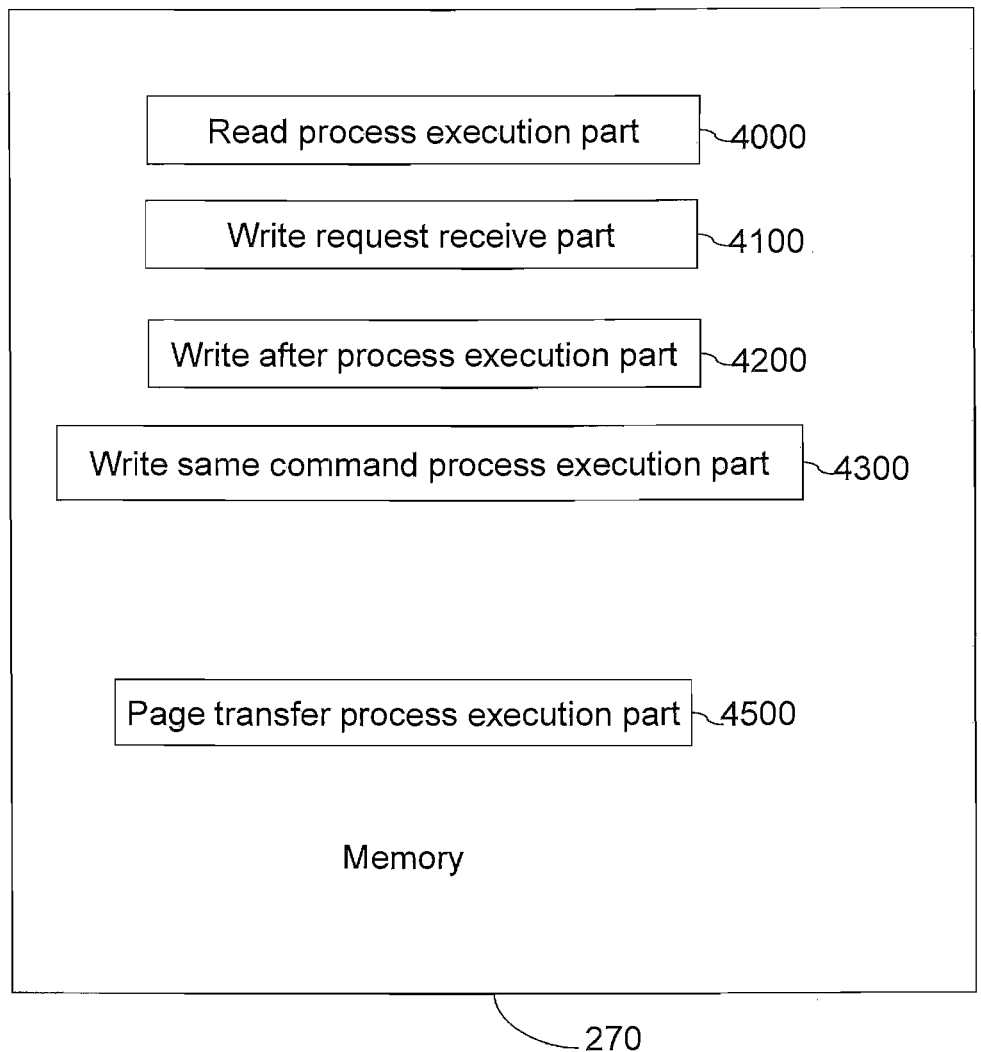
FIG. 19 is a diagram showing higher-level control programs inside a memory of the storage controller in the example of the present invention.

FIG. 19 shows the programs stored in the memory 270.

The programs related to this example include, for example, a read process execution part 4000, a write request receive part 4100, a write after process execution part 4200, a write same command process execution part 4300, and a page transfer process execution part 4500. At least one of these programs is a program for realizing the higher-level capacity virtualization technology. Furthermore, as already explained, in this example, the flash package 230 realizes the lower-level capacity virtualization technology, but the storage controller 200 may execute the lower-level capacity virtualization technology. In this case, the lower-level capacity virtualization technology is executed by the storage controller 200. Therefore, since the higher-level program and the lower-level program are both executed by the storage controller 200, the interface between the programs will differ, but fundamentally there are no major differences. The flows of processing of the read process execution part 4000, the write request receive part 4100, the write after process execution part 4200, the write same command process execution part 4300, and the page transfer process execution part 4500 will be explained in detail on the premise that the lower-level capacity virtualization technology is realized by the flash package 230 in this example. Furthermore, in this example, it is supposed that a read request, a write request and a write same command from the host 110 are issued for one segment (a page in ordinary flash memory terminology) or more segments, the segment being the read/write unit of the flash memory. Of course, the present invention will still be valid even in a case where a read request, a write request and a write same command from the host 110 specify only a portion of the segment.

Furthermore, in the following explanation, there may be cases where processing is explained having a program as the doer of the action, but since the stipulated processing may be performed in accordance with a program being executed by a processor (for example, a CPU (Central Processing Unit)) while using a storage resource (for example, a memory) as needed, the processor may also be used as the subject of the processing. Processing that is explained using the program as the doer of the action may be processing carried out by a storage controller, a flash package, or a storage system.

Figure 20:
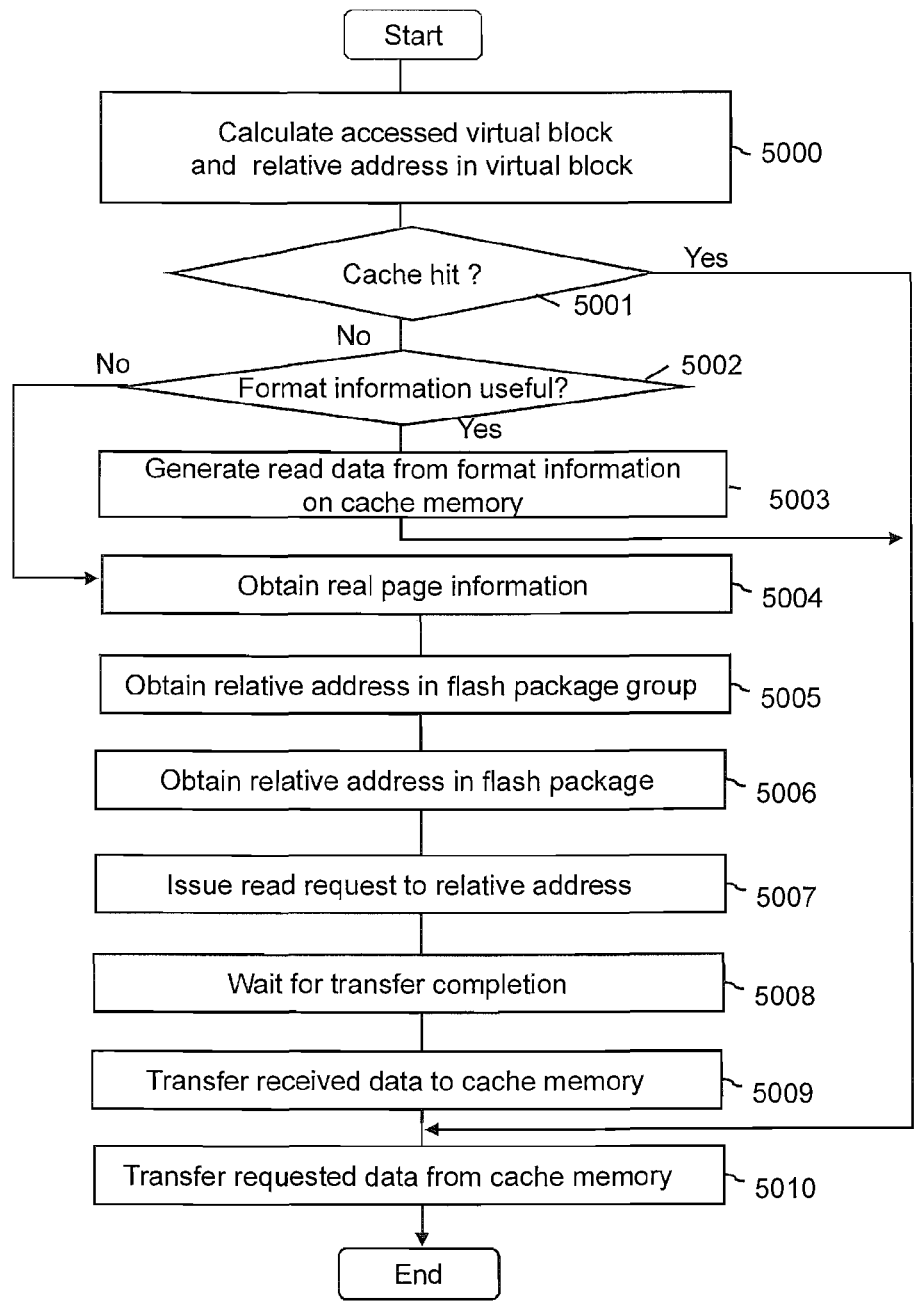
FIG. 20 is a diagram showing the flow of processing of a read process execution part in the example of the present invention.

FIG. 20 is the flow of processing of the read process execution part 4000. The read process execution part 4000 is executed when the storage controller 200 has received a read request from the host 110.

Step 5000: The read process execution part 4000 computes a relative address with respect to the read-source virtual page (the virtual page to which the read-targeted address specified in the read request from the host 110 belongs).

Step 5001: The read process execution part 4000 checks whether there was a hit in the cache memory 210 with respect to the read-targeted data. This is widely known technology. In the case of a cache hit, the read process execution part 4000 jumps to Step 5010.

Step 5002: In the case of a cache miss, the read process execution part 4000 first checks whether the format information 2005 is valid. In the case of an invalid value, the read process execution part 4000 jumps to Step 5004.

Step 5003: A case in which the format information 2005 is valid signifies that cyclic information is stored in the read-source area (the storage area conforming to the identified relative address). For this reason, the read process execution part 4000 stores this cyclic information in the cache memory 210, and jumps to Step 5010.

Step 5004: The read-targeted data must be loaded into the cache memory 210 at this point. In this step, the read process execution part 4000 first acquires the real page information 2100 corresponding to the real page allocated to the read-source virtual page from the real page pointer 2004 of the logical block management information 2000.

Step 5005: The read process execution part 4000, based on the package group 2101 and the real page address 2102 of the acquired real page information 2100, identifies the flash package group (read source package group in FIG. 20) 280 on which is based the real page allocated to the read-source virtual page (the read-source real page in FIG. 20) and the first address in the read-source package group 280.

Step 5006: The read process execution part 4000 computes the relative address inside the read-source real page based on the relative address in the virtual page obtained in Step 5001 and the package group RAID type 2302 corresponding to the read-source package group 280. The read process execution part 4000 identifies the address of the flash package 230 to be accessed based on the computed relative address inside the real page and the package group RAID type 2302 and flash package pointer 2305 corresponding to the read-source package group.

Step 5007: The read process execution part 4000 sends the read request specifying the address identified in Step 5006 to the flash package 230 identified in Step 5006.

Step 5008: The read process execution part 4000 waits for the data to be sent from the send-destination flash package 230 of the read request of Step 5007.

Step 5009: The read process execution part 4000 stores the data sent from the flash package 230 corresponding to the read request of Step 5007 in the cache memory 210.

Step 5010: The read process execution part 4000 sends the data (the read data) stored in the cache memory 210 in Step 5009 to the host 110, and ends the processing.

Figure 21:
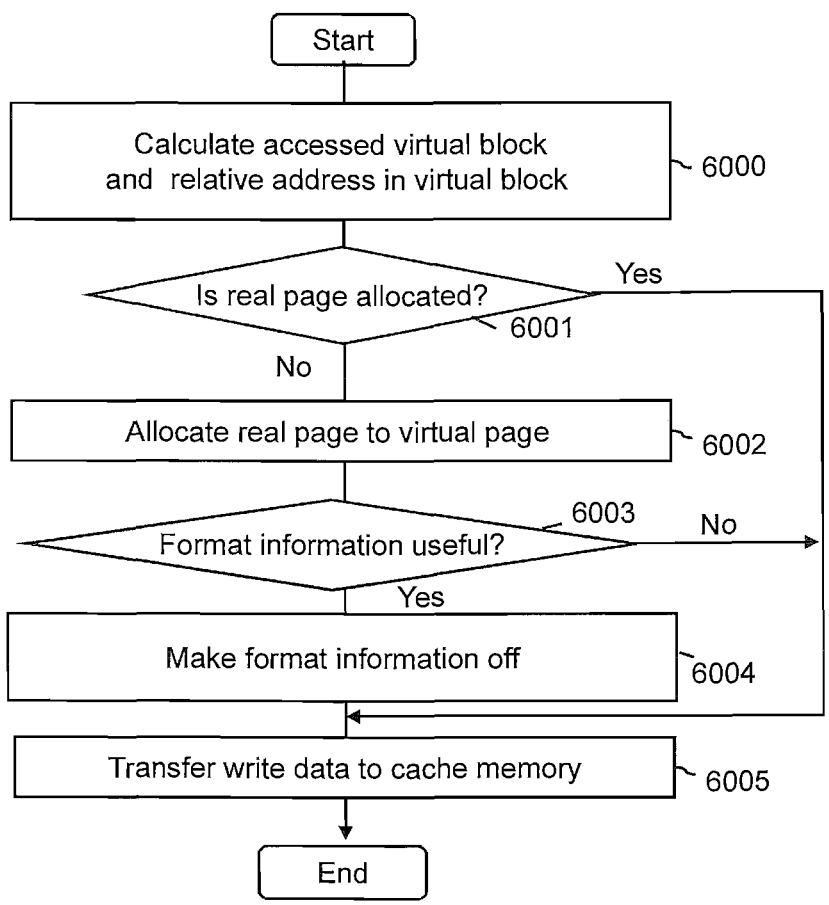
FIG. 21 is a diagram showing the flow of processing of a write request receive part in the example of the present invention.

FIG. 21 is the flow of processing of the write request receive part 4100. The write request receive part 4100 is executed when the storage controller 200 receives a write request from the host 110.

Step 6000: The write request receive part 4100 computes the relative address inside the write-destination virtual page with respect to the write-destination virtual page (the virtual page to which the write-targeted address specified by the write request from the host 110 belongs).

Step 6001: The write request receive part 4100 checks whether a real page has been allocated to the write-destination virtual page based on the real page pointer 2004 in the logical volume information 2000 corresponding to the write-destination volume (the logical volume specified by the write request). In a case where a real page has been allocated, the write request receive part 4100 jumps to Step 6005.

Step 6002: In this step, the write request receive part 4100 allocates a real page to the write-destination virtual page. The write request receive part 4100 decides the flash package group 280-based real page to be allocated based on the RAID type 2002 in the logical volume information 2000 corresponding to the write-destination volume and the package group RAID type 2302 and the number of empty real pages 2304 in the flash package group information 2300. Thereafter, the write request receive part 4100 sets this real page pointer 2004 to show the first empty page information 2100 on the basis of the empty page management information pointer 2200 corresponding to the determined flash package group (the write-destination package group) 280. A real page is allocated to the write-destination virtual page in accordance with this. Furthermore, the write request receive part 4100 sets the empty page management information pointer 2200 to show the next real page information 2100 (the real page information 2100 shown by the empty page pointer 2103 in the real page information 2100 of the real page allocated to the virtual page), and, in addition, sets the empty page pointer 2103 in the real page information 2100 of the real page allocated to the virtual page to NULL. Furthermore, the write request receive part 4100 decreases the number of the number of empty pages 2304 of the flash package group management information corresponding to the relevant real page. In this example, the allocation of a virtual page to a real page is carried out when a write request is received, but in the present invention, this allocation process may be executed until the data is stored in the flash package 230.

Step 6003: The write request receive part 4100 checks whether the format information 2005 is valid. In a case where the format information 2005 is not valid, the write request receive part 4100 jumps to Step 6005.

Step 6004: The write request receive part 4100 invalidates the format information 2005.

Step 6005: The write request receive part 4100 stores the write data conforming to the write request from the host 110 in the cache memory 210.

Since the flash package group 280 has a RAID configuration, redundancy data must be generated with respect to the write data stored in the cache memory 210. However, this is a known method, and as such will not be explained in detail. Also, since an area for storing redundancy data is included in the real page, the virtual address inside the real page of the redundancy data corresponding to the write data is also uniquely determined. The redundancy data is also stored once in the cache memory 210. Furthermore, information showing to the address of the flash package 230 to which writing should be carried out is also attached to the redundancy data in the cache memory 210 the same as the write data. The write data and the redundancy data are written to the flash package 160 by the write after process execution part 4200, but since these data are both written to the flash package 230 as seen from the write after process execution part 4200, there is no need to distinguish between the two. Similarly, there is also no need for the flash package 230 to distinguish between the two.

Figure 22:
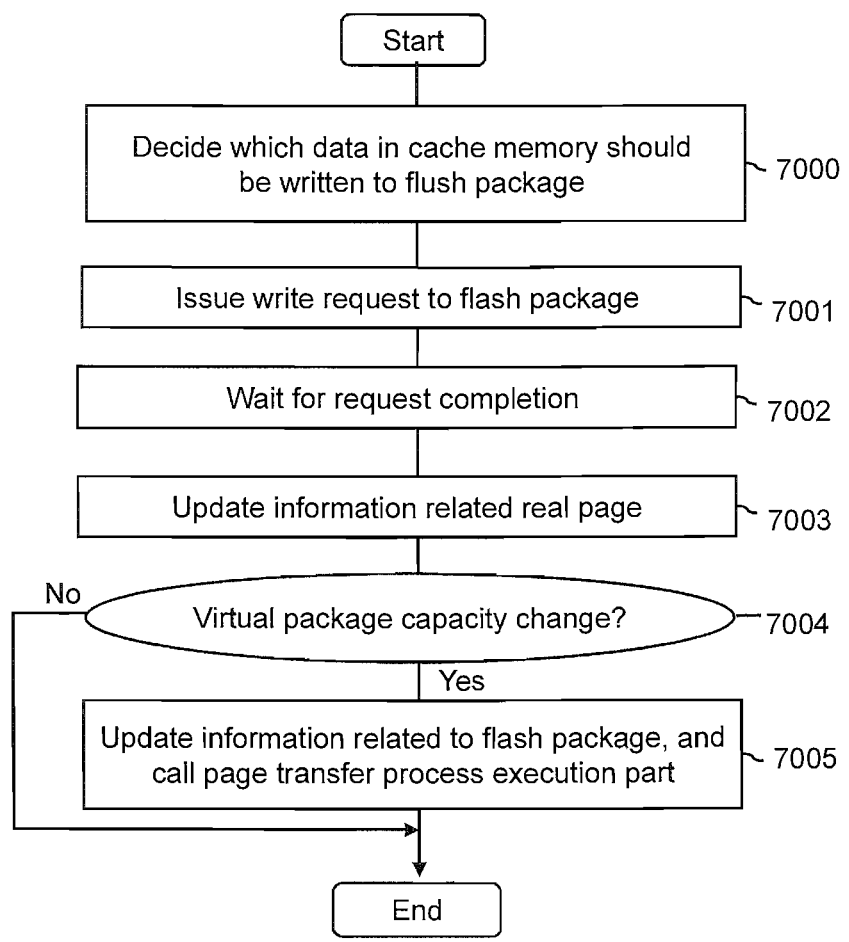
FIG. 22 is a diagram showing the flow of processing of a write after process execution part in the example of the present invention.

FIG. 22 is the flow of processing of the write after process execution part 4200. The write after process execution part 4200 is executed arbitrarily by the processor 260. The write after process execution part 4200 writes the write data (and redundancy data) from the host 110 to the flash package 230. The write after process execution part 4200 processes both the write data and the redundancy data as data to be written to the flash package 230 without distinguishing between the two.

Step 7000: The write after process execution part 4200 searches the cache memory 210 and determines the data to be written to the flash package 230. The write after process execution part 4200 identifies the information associated with the data that was found (for example, the ID of the flash package 230 and information related to the write-destination address in this package 230), and issues a write request specifying the identified write destination (for example, the flash package 230 ID and the write-destination address) to the write-destination flash package 230. Furthermore, the write after process execution part 4200 checks the moving state flag 2109 of the real block information 2500 corresponding to the real block allocated to the virtual block that belongs to the write destination at this time, and in a case where this flag 2109 is ON, cancels the execution of the write request specifying the relevant write destination since this real page is in the process of being transferred, and searches for different data in the cache memory 210.

Step 7001: The write after process execution part 4200 sends the write data to the flash package 230.

Step 7002: The write after process execution part 4200 waits for a write request completion report from the flash package 230.

Step 7003: The write after process execution part 4200 checks the completion report related to the relevant write request from the flash package 230. The completion report, for example, comprises information denoting the amount of stored data (the amount of write data sent in Step 7001) and the amount of compressed and stored data (the amount of compressed write data sent in Step 7001). This information may be sent from the flash package 230 to the storage controller 200 at a different time than the completion report. The write after process execution part 4200 identifies the amount of stored data and the amount of compressed and stored data denoted in the information included in the completion report with respect to the relevant write request, adds the identified amount of stored data to the amount of stored page data 2104 corresponding to the write-destination real page, and, in addition, adds the amount of identified compressed and stored data to the amount of compressed and stored page data 2105 corresponding to the write-destination real page.

Step 7004: The write after process execution part 4200 at this point checks whether or not there is a flash package 230 for which the virtual capacity has changed. In a case where no such flash package 230 exists, the processing ends.

Step 7005: In a case where a flash package 230 for which the virtual capacity has changed does exist, the write after process execution part 4200 configures the post-change virtual capacity in the flash package virtual capacity 2502 corresponding to the flash package 230 for which the virtual capacity has changed. Next, the write after process execution part 4200 checks whether the smallest value of the plurality of flash package virtual capacities 2502 corresponding to the plurality of flash packages 230 configuring the flash package group 280, which comprises the flash package 230 for which the virtual capacity changed, has changed. In the case of a change, the write after process execution part 4200 updates the number of real pages 2303 and the number of empty real pages 2304 corresponding to this flash package group 280 in accordance with this changed value. Furthermore, the write after process execution part 4200 transfers the real page information 2100 between the empty page information management queue and the unavailable page information management queue in accordance with this number. Thereafter, the write after process execution part 4200 calls a page transfer process (the page transfer process execution part 4500). After that, the write after process execution part 4200 ends the processing.

Figure 23:
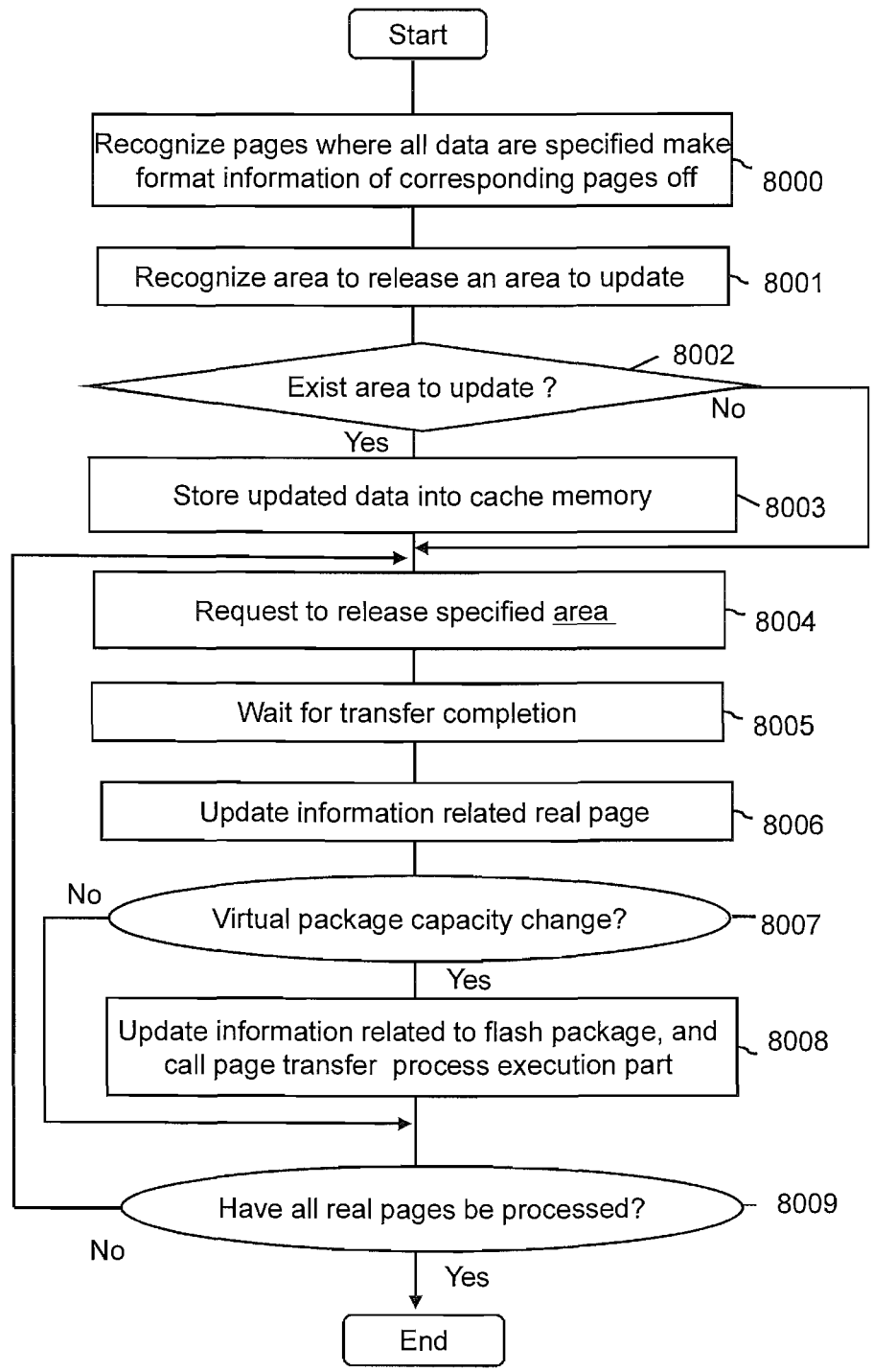
FIG. 23 is a diagram showing the flow of processing of a write same command process execution part in the example of the present invention.

FIG. 23 is the flow of processing of the write same command process execution part 4300. The write same command process execution part 4300 is executed when the storage controller 200 receives a write same command from the host 110. The write same command is a function, which is provided corresponding to the capacity virtualization function of the storage system 100. The write same command instructs that a short data pattern be repetitively written to a certain storage area. The storage system 100 does not write this data pattern to the flash memory, but rather stores the fact that this data pattern has been repeatedly stored in the virtual page comprising the specified storage area, and in a case where a real page has been allocated to this virtual page, releases this real page. This makes it possible to reduce the number of real pages being used. Generally speaking, in a capacity virtualization function in a system in which a HDD (Hard Disk Drive) is being used as the storage medium, no physical processing occurs in the HDD when a real page is released. However, in this example, in which a flash memory is used as the storage medium, a real block delete process must be executed since the real block will be allocated to another virtual block. Therefore, a delete process is executed to the real block to release the same. In this example, the storage controller 200, upon receiving a write same command, requests that the flash package 230 perform a real block delete process. Furthermore, the present invention is still valid even when a write same command is sent to the flash package 230, and the flash package 230 executes the above processing. Or, the present invention will be valid even in a case where the host 110 issues a more direct command to release a certain storage area, and the storage controller 200 or the flash package 230 executes the same processing as when a write same command has been received. Furthermore, the present invention is still valid even in a case where cyclic information such as all 0's is written in accordance with a normal write command, the storage controller 200 or the flash package 230 recognizes the cyclic information, and releases the real block allocated to the write-destination virtual block.

Step 8000: The write same command process execution part 4300, based on write-destination information (for example, the address) specified in the received write same command, determines a collection of virtual pages, which will be the process target of the relevant command. Furthermore, these virtual pages are sorted into those for which the entire virtual page is the process target of the relevant command, and those for which a portion of the virtual page constitutes the process target. In a case where an entire virtual page is specified, the write same command process execution part 4300 sets the data pattern in the format information 2005 corresponding to this virtual page.

Step 8001: Next, the information sent to the flash package 230 will be described. Since the flash package 230 address space is a virtual address space of a virtual segment base, in this example, a request to convert the area specified in the write same command to a flash package address space is sent (This conversion is a well-known technique, and as such will not be explained in detail). However, in a case where one piece of redundancy data is created from N pieces of data as in RAID 5, the area where the redundancy data is stored can be released when the area in which all of the N pieces of data of the stripe group are stored has been specified by the relevant command. In a case where only the area of a portion of the N pieces of data has been specified, on the contrary, this cyclic information must be reflected in the redundancy data, thereby making it necessary to update the area(s) storing this redundancy data. In this step, the area(s) is/are sorted into an area(s) that require updating and an area(s) capable of being released in accordance with the relevant command specification.

Step 8002: In a case where there are no segments for which data updating is required, the processing jumps to Step 8004.

Step 8003: The write same command process execution part 4300 creates the redundancy data to be written to the flash package 230 and stores this redundancy data in the cache memory 210. Information as to the area of the flash package 230 to which the redundancy data is to be written is associated with this redundancy data at this time. Thereafter, the specified cyclic information is written to the flash package 230 by the write after process execution part 4200 shown in FIG. 22. Thereafter, the processing ends when there is no area to be released.

Step 8004: The write same command process execution part 4300 communicates the flash package 230 and the storage area thereof determined in Step 8001 to this flash package 230, and requests the release of the corresponding segments. Furthermore, it is supposed here that the area regarding which the request was issued to the flash package 230 is partitioned into real page units. Naturally, there will be cases in which all of the areas included in the real page are specified, and cases in which a portion of a virtual area is specified. This request is issued to an arbitrary number of the one or more flash packages 230 configuring the flash package group 280.

Step 8005: The write same command process execution part 4300 waits for a process report from the flash package 230 that was the write destination of the request in Step 8004.

Step 8006: The write same command process execution part 4300 checks for a completion report related to this request from the flash package 230. First, the write same command process execution part 4300 processes information denoting the amount of stored data and the amount of compressed and stored data from the information included in the completion report received from the flash package 230 with respect to the relevant request. Specifically, the write same command process execution part 4300 adds the changed values of the amount of stored data and the amount of compressed and stored data corresponding to the virtual block group included in a single real page to the amount of stored page data 2104 and the amount of compressed and stored page data 2105 corresponding to this real page.

Step 8007: At this point, the write same command process execution part 4300 checks each flash package 230 as to whether or not there has been a change in virtual capacity. In a case where none of the flash packages 230 has experience a change in virtual capacity, the processing is brought to Step 8009.

Step 8008: The write same command process execution part 4300 sets the post-change virtual capacity in the flash package virtual capacity 2502 corresponding to the flash package(s) 230 for which there was a change in virtual capacity. Next, the write same command process execution part 4300 checks whether the smallest value of the plurality of flash package virtual capacities 2502 corresponding to the plurality of flash packages 230 configuring the flash package group 280, which comprises the flash package(s) 230 for which there was a change in virtual capacity, has changed. In the case of a change, the write same command process execution part 4300 updates the number of real pages 2303 and the number of empty real pages 2304 corresponding to this flash package group 280 in accordance with this changed value. Furthermore, the write same command process execution part 4300 transfers the real page information 2100 between the empty page information management queue and the unavailable page information management queue in accordance with this number. Thereafter, the write same command process execution part 4300 calls a page transfer process (the page transfer process execution part 4500). After that, the write after process execution part 4300 ends the processing.

Step 8009: Furthermore, in a case where a real page for which a request has not been issued to the flash package 230 exists among the real pages comprising the releasable area(s), the write same command process execution part 4300 jumps to Step 8004. In a case where such a real page does not exist, the write same command process execution part 4300 ends the processing.

Figure 24:
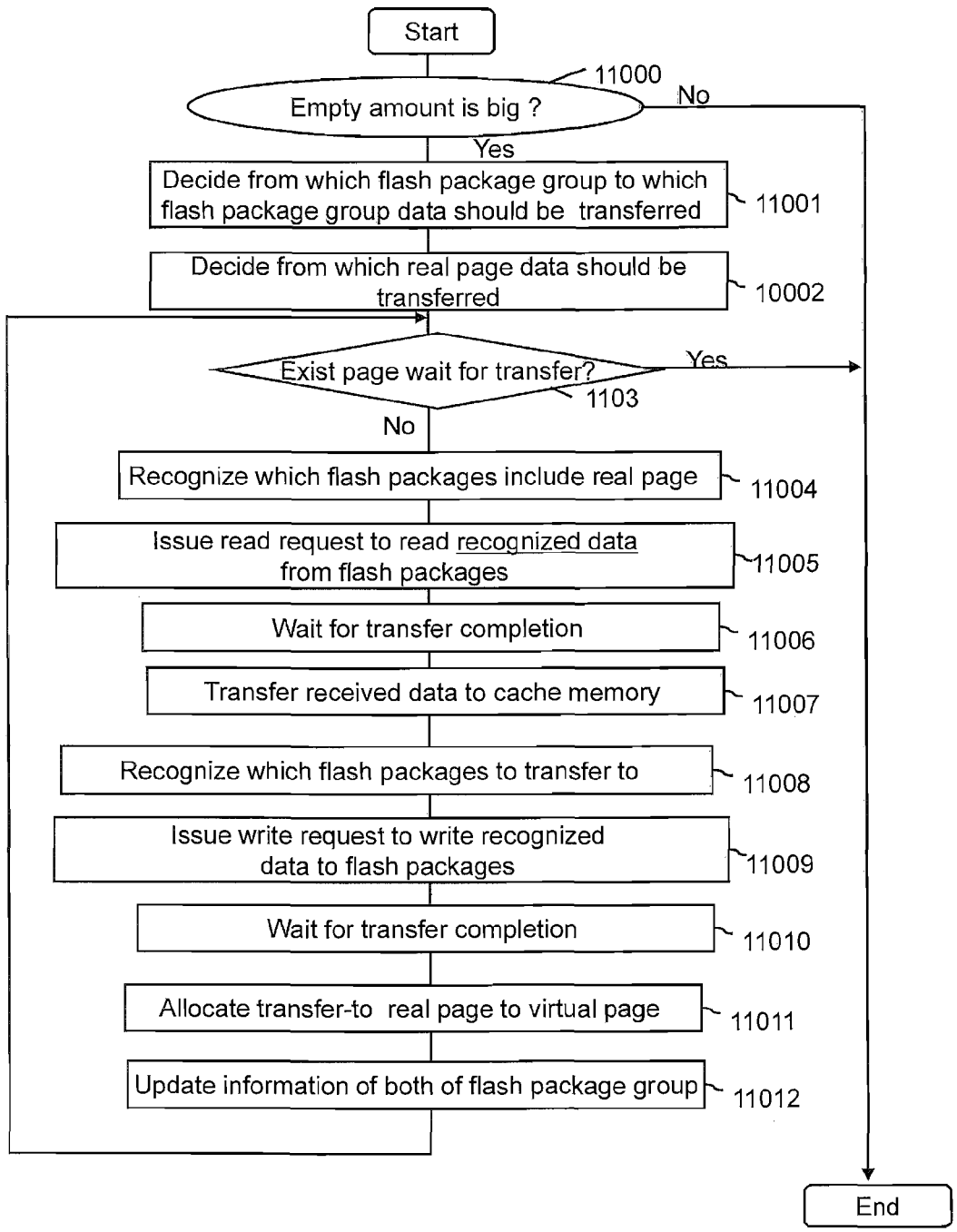
FIG. 24 is a diagram showing the flow of processing of a page transfer process execution part in the example of the present invention.

FIG. 24 is the flow of processing of the page transfer process execution part 4500.

The page transfer process execution part 4500 is called from the write after process execution part 4200 and the write same command process execution part 4300. The flash package group 280 comprising the flash package 230 in which there has been a change in the virtual capacity is specified at this time.

Step 11000: The page transfer process execution part 4500 determines whether the number of empty real pages 2304 corresponding to the specified flash package group 280 (will be called the "target group" in the explanation of FIG. 24) is not equal to or less than a prescribed threshold (that is, whether or not there is a lot of empty capacity based on the target group 280). In a case where the result of this determination is negative, the processing ends.

Step 11001: The page transfer process execution part 4500 searches the real page information 2100 corresponding to the plurality of flash packages 230 configuring the target group to find the real page information 2100 in which the value denoted by the amount of compressed and stored page data 2105 is large. A real page for which the value denoted by the amount of compressed and stored page data 2105 is large may be one or more of all the real pages based on the target group in which the value denoted by the amount of compressed and stored page data 2105 is in the top X % (where X is a value larger than 0), or may be a real page in which the value denoted by the amount of compressed and stored page data 2105 is equal to or larger than a prescribe threshold Z (where Z is a value larger than 0). The page transfer process execution part 4500 makes the real page corresponding to the discovered real page information 2100 the transfer target candidate, and turns ON the waiting state for transferring 2111 corresponding to this real page.

Step 11002: At this point, the page transfer process execution part 4500 selects the flash package group 280 that will be the transfer destination. In this example, one flash package group 280 is selected, but, it goes without saying that a plurality of flash package groups 280 may be selected as transfer destinations. In this example, for example, the page transfer process execution part 4500 selects as the transfer destination a flash package group 280 with a relatively small number of empty real pages 2104 (for example, the flash package group 280 for which the number of empty real pages 2104 is either the smallest or is less than the prescribed threshold). Next, the page transfer process execution part 4500 decides which of the real pages inside the selected transfer-destination flash package group (the "transfer-destination group" in the explanation of FIG. 24) 280 will be the transfer destination. Upon deciding the transfer-destination real page, the page transfer process execution part 4500 sets the real page information 2100 pointed to by the empty page information management pointer 2200 corresponding to the transfer-destination group 280 in the copy-destination transfer to real page pointer 2110 of the real page information 2100 of the transfer-source real page. The page transfer process execution part 4500 updates the empty page information management pointer 2200 in the page management information 2100 corresponding to the next empty real page. The above processing is executed with respect to all the real pages for which a transfer decision was made in Step 11001. A transfer-destination page is determined for each transfer-source real page in accordance with the above.

Step 11003: At this point, the page transfer process execution part 4500 decides the real page information 2100 of the real page that is to be the transfer source. Specifically, the page transfer process execution part 4500 finds the real page information 2100 for which the waiting state for transferring 2111 is ON. When the information is not found, the processing ends and the page transfer process execution part 4500 returns to the call source.

Step 11004: At this point, the page transfer process execution part 4500 computes the flash package 230 making up the real page corresponding to the discovered real page information 2100. The flash package group information 2300 showing the package group 2101 of the discovered real page information 2100 is the relevant flash package group information 2300. The flash package(s) 230 corresponding to the flash package information 2500 shown by the flash package pointer 2305 stored in this flash package group information 2300 is/are the flash package(s) 230 constituting the basis of the copy-source real page. Next, the page transfer process execution part 4500, based on the real page address 2102 inside the real page information 2100 and the block capacity 2503 of the flash package information 2500, identifies the area constituting the transfer target in each flash package 230 with respect to all of the flash packages 230.

Step 11005: The page transfer process execution part 4500 requests that each flash package 230 configuring the flash package group 280 constituting the basis of the transfer-source real page(s) transfer the data of the data-storing area of the identified areas to the cache memory 210.

Step 11006: The page transfer process execution part 4500 waits for a completion report from the flash package 230, which was the destination of the request issued in Step 11005.

Step 11007: Information as to whether or not data has been stored for each region (for each virtual segment in this embodiment) in each virtual segment is sent from the flash package 230. In a case where such data has been stored, the amount of this compressed and stored data are also sent from the flash package 230. The page transfer process execution part 4500 stores this information in the cache memory 210.

Step 11008: The page transfer process execution part 4500 at this point computes the collection of flash packages 230 configuring the flash package group 280 constituting the basis of the transfer-source real page thereof, and the collection of virtual segments in each flash package 230 to which the transfer-destination real page corresponds. In this case, the real page information 2100 shown by the transfer-destination real page address of the real page information 2100 corresponding to the transfer-source real page is the real page information 2100 corresponding to the transfer-destination real page. The process for computing, based on the real page information 2100, the collection of flash packages 230 configuring the flash package group 280, and the area of each flash package 230 constituting the transfer-destination real page has been explained in Step 11004, and as such an explanation of this process will be omitted.

Step 11009: The page transfer process execution part 4500 requests that each flash package 230 configuring the flash package group 280 to which the transfer-destination real page is allocated store the data in the specified area. The information stored in the cache memory 210 in Step 1107 (the information that was sent from the migration-source flash package 230) and data about the data-storing area(s) in the migration-source real page are sent to each flash package 230 at this time.

Step 11010: The page transfer process execution part 4500 waits for a completion report from the flash package 230, which is the destination of the request issued in Step 11009.

Step 11011: The page transfer process execution part 4500 manages the transfer-source real page as an empty real page, and, in addition, allocates the transfer-destination real page to the virtual page to which the transfer-source real page is allocated in place of this transfer-source real page. Specifically, for example, the page transfer process execution part 4500 links the real page information 2100 corresponding to the transfer-source real page to the empty page information management pointer 2200, and sets the real page pointer 2004, which had been showing the real page information 2100 corresponding to the transfer-source real page, to show the transfer-destination real page information 2100. Furthermore, the page transfer process execution part 4500 copies the amount of stored page data 2104 and the amount of compressed and stored page data 2105 in the real page information 2100 corresponding to the transfer-source real page to the real page information 2100 corresponding to the transfer-destination real page. Thereafter, the page transfer process execution part 4500 clears the moving state flag 2109, the transfer to real page pointer 2110, and the waiting state for transferring 2111 in the real page information 2100 corresponding to both the transfer-source real page and the transfer-destination real page.

Step 11012: The page transfer process execution part 4500 updates the flash package group information (hereinafter, the transfer-source group information) 2300 corresponding to the transfer-source flash package group 280, and the flash package group information (hereinafter, the transfer-destination group information) 2300 corresponding to the transfer-destination flash package group 280. Specifically, 1 is taken away from the value denoted by the number of empty real pages 2304 in the transfer-source group information 2300, and 1 is added to the value denoted by the number of empty real pages 2304 in the transfer-destination group information 2300. After this, the page transfer process execution part 4500 jumps to Step 11003 to search for the next transfer-target real page.

Next, the operations executed by the flash package 230 will be explained. Most of the operations of the flash package 230 are carried out in accordance with the package processor 310 executing a computer program, and this program is stored in the package memory 320.

Figure 25:
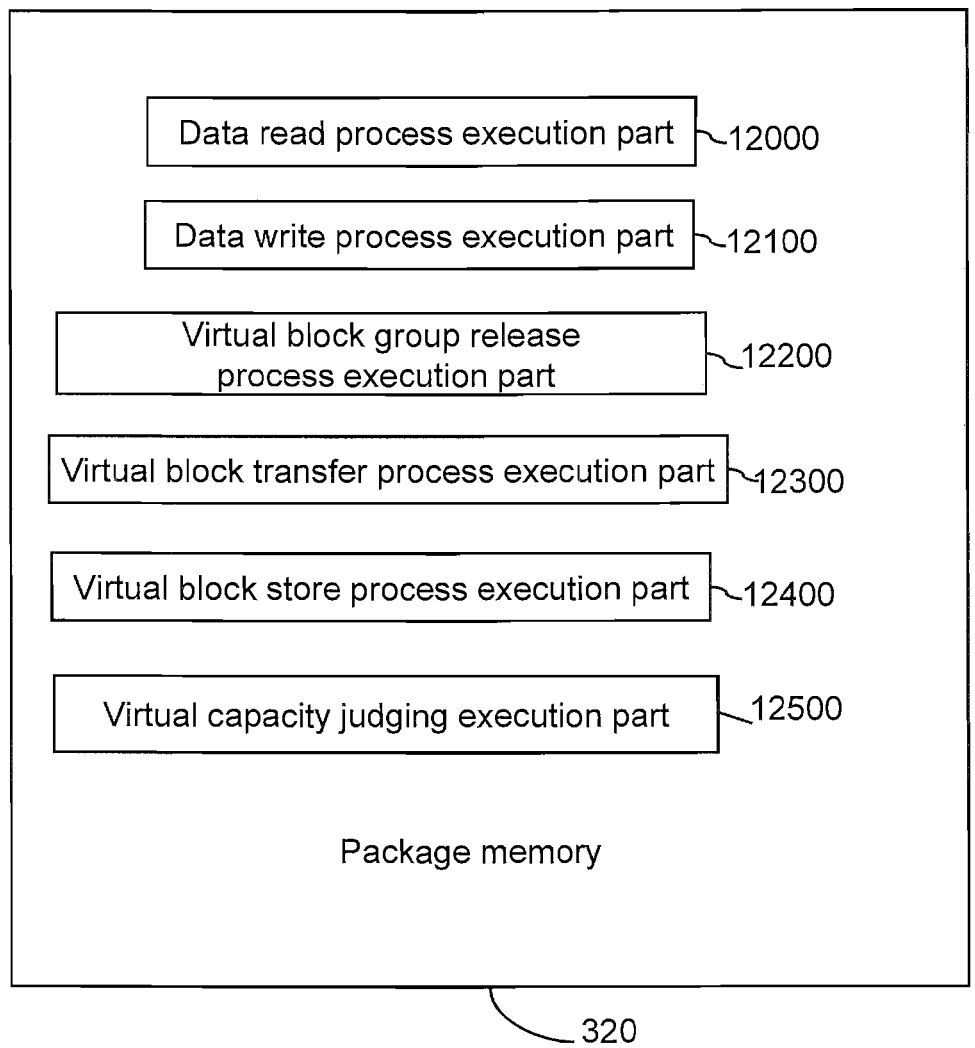
FIG. 25 is a diagram showing programs stored in the package memory of the flash package in the example of the present invention.

FIG. 25 shows the programs stored in the package memory 320.

Figure 26:
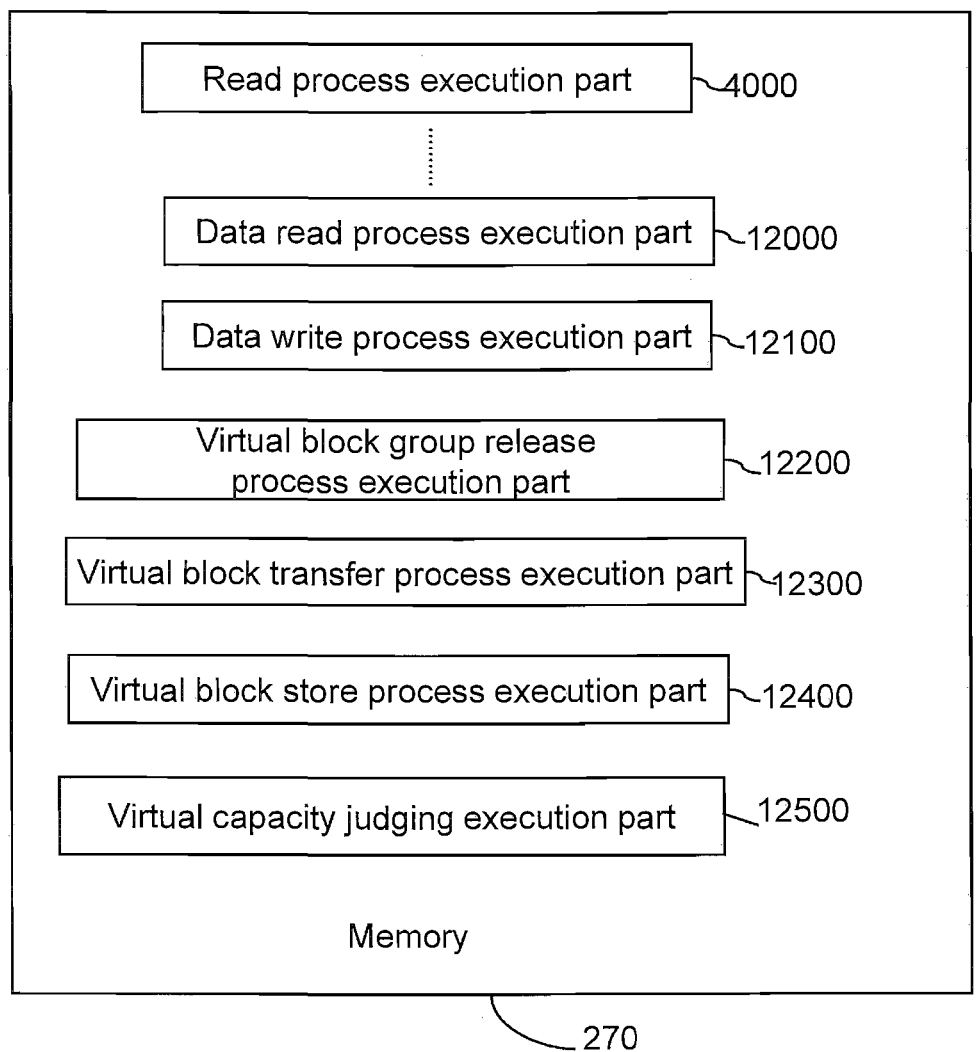
FIG. 26 is a diagram showing a configuration in which lower-level control programs have been stored in the memory of the storage controller.

The package memory 320 stores a data read process execution part 12000, a data write process execution part 12100, a virtual block release process execution part 12200, a virtual block transfer process execution part 12300, a virtual block store process execution part 12400, and a virtual capacity judging execution part 12500. At least one of these programs is for realizing the lower-level capacity virtualization technology. In this example, the flash package 230 realizes the lower-level capacity virtualization technology. However, the present invention may be such that the storage controller 200 realizes the lower-level capacity virtualization technology. In this case, as shown in FIG. 26, substantially the same programs as the programs shown in FIG. 25 are stored in the common memory 220. Because the programs in the configuration shown in FIG. 26 are executed by the storage controller 200, these program differ slightly from the programs shown in FIG. 25. Therefore, in this example, it is supposed that the flash package 230 realizes the lower-level capacity virtualization technology, and as such, the flow of processing of the data read process execution part 12000, the data write process execution part 12100, the virtual block release process execution part 12200, the virtual block transfer process execution part 12300, the virtual block store process execution part 12400, and the virtual capacity judging execution part 12500 shown in FIG. 25 will be explained in detail.

Figure 27:
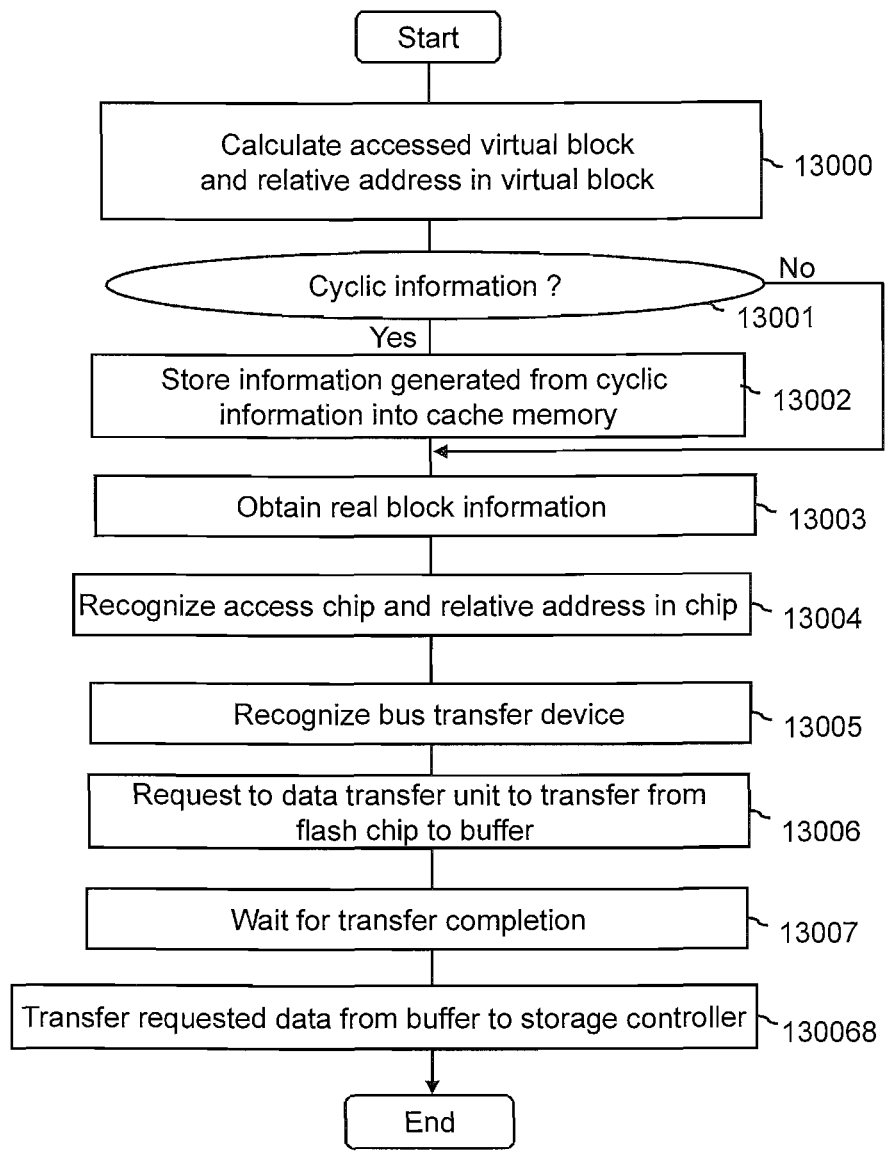
FIG. 27 is a diagram showing the flow of processing for a data read process execution part in the example of the present invention.
Figure 28:
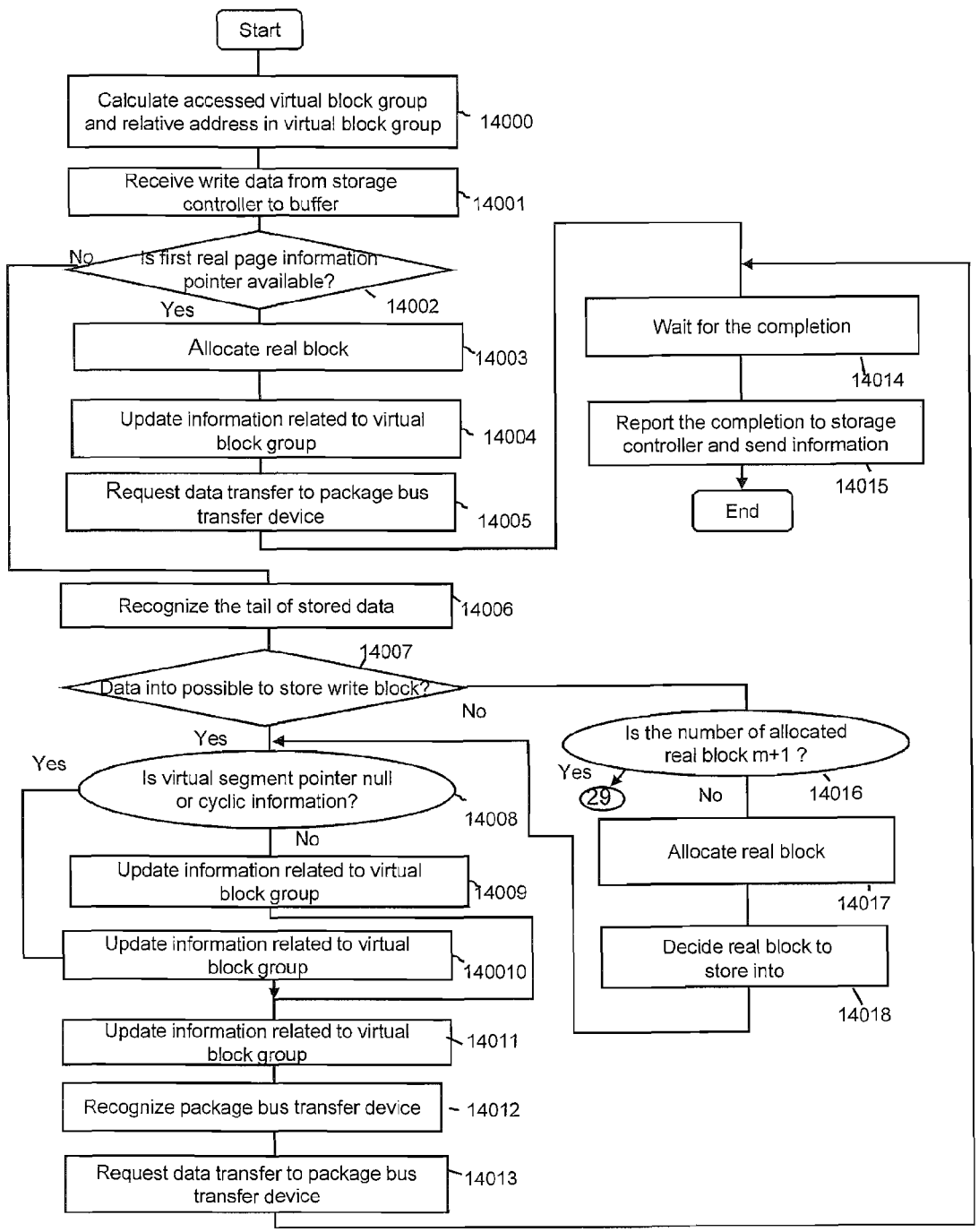
FIG. 28 is a diagram showing a portion of the flow of processing for a data write process execution part in the example of the present invention.

FIG. 27 is the flow of processing of the data read process execution part 12000. The data read process execution part 12000 is executed when the flash package 230 receives a read request from the storage controller 200. Furthermore, the flow of processing of FIG. 27 is that for reading data stored in one virtual block group. However, the present invention will still be valid even in a case where data stored in a plurality of virtual block groups is read in accordance with a read request. Furthermore, the flow of processing of FIG. 28 is the processing flow when data is read in virtual segment units. However, the present invention will be valid even in a case where the read request is such that data from a portion of the virtual segment is to be read.

Step 13000: The data read process execution part 12000, based on the read-target address specified in the received read request and the package block capacity 3005, computes the corresponding virtual block group (the read-source virtual block group) and the relative address in the read-source virtual block group. In accordance with this, it becomes possible to identify the virtual block information 3200 corresponding to the read-source virtual block group. Furthermore, the corresponding virtual segment is identified from the relative address in the virtual block group. The address in the real block in which this virtual segment is stored (allocated) is identified based on the virtual segment address pointer 3205 corresponding to this virtual segment.

Step 13001: Provided that the information identified in Step 13000 (the information showing the address inside the real block in which the virtual segment is stored) does not signify that cyclic information is being stored, the data read process execution part 12000 jumps to Step 13003.

Step 13002: The data read process execution part 12000 stores the cyclic information stored in the amount of compressed virtual segment data 3206 in the buffer 330 in proportion to the length of the corresponding virtual segment. Thereafter, the data read process execution part 12000 jumps to Step 13008.

Step 13003: The data read process execution part 12000 identifies the real block information 3300 corresponding to the real block allocated to each read-source virtual block based on the real block information pointer 3202 of the virtual block information 3200 corresponding to each read-source virtual block.

Step 13004: The data read process execution part 12000 identifies the first address in the flash chip 300 from which a real block, which is identified from the real block identifier 3301 of each identified real block management information 3300, is stored. Next, the data read process execution part 12000 computes the relevant address of the relevant flash chip 300 in which each virtual segment, which has been identified on the basis of the relevant read request from the relevant virtual segment address pointer 3205, is stored. Furthermore, in a case where the virtual segment is stored in a portion of the real segment, the entire real segment, which includes the virtual segment, becomes the read target.

Step 13005: The data read process execution part 12000 accesses the chip information 3100 corresponding to the flash chip 300 identified in Step 13004, identifies the package bus 340 to which the relevant flash chip 300 is coupled, and identifies the corresponding bus transfer device 350.

Step 13006: The data read process execution part 12000 instructs the bus transfer device 350 identified in Step 13005 to transfer data from the Step 13004-identified address of the flash chip 300 identified in Step 13004 to the buffer 330. Furthermore, the data read process execution part 12000 instructs the compression extension circuit 360B to extend the data in synch with the data transfer.

Step 13007: Thereafter, the data read process execution part 12000 waits for the transfer to be complete.

Step 13008: The data read process execution part 12000 sends the data of the requested virtual segment from among the data stored in the buffer 330 (the data stored in the buffer in Step 13001 or the data extended in Step 13007 in accordance with the instruction of Step 13006) to the storage controller 200. After this, the data read process execution part 12000 ends the processing.

Figure 29:
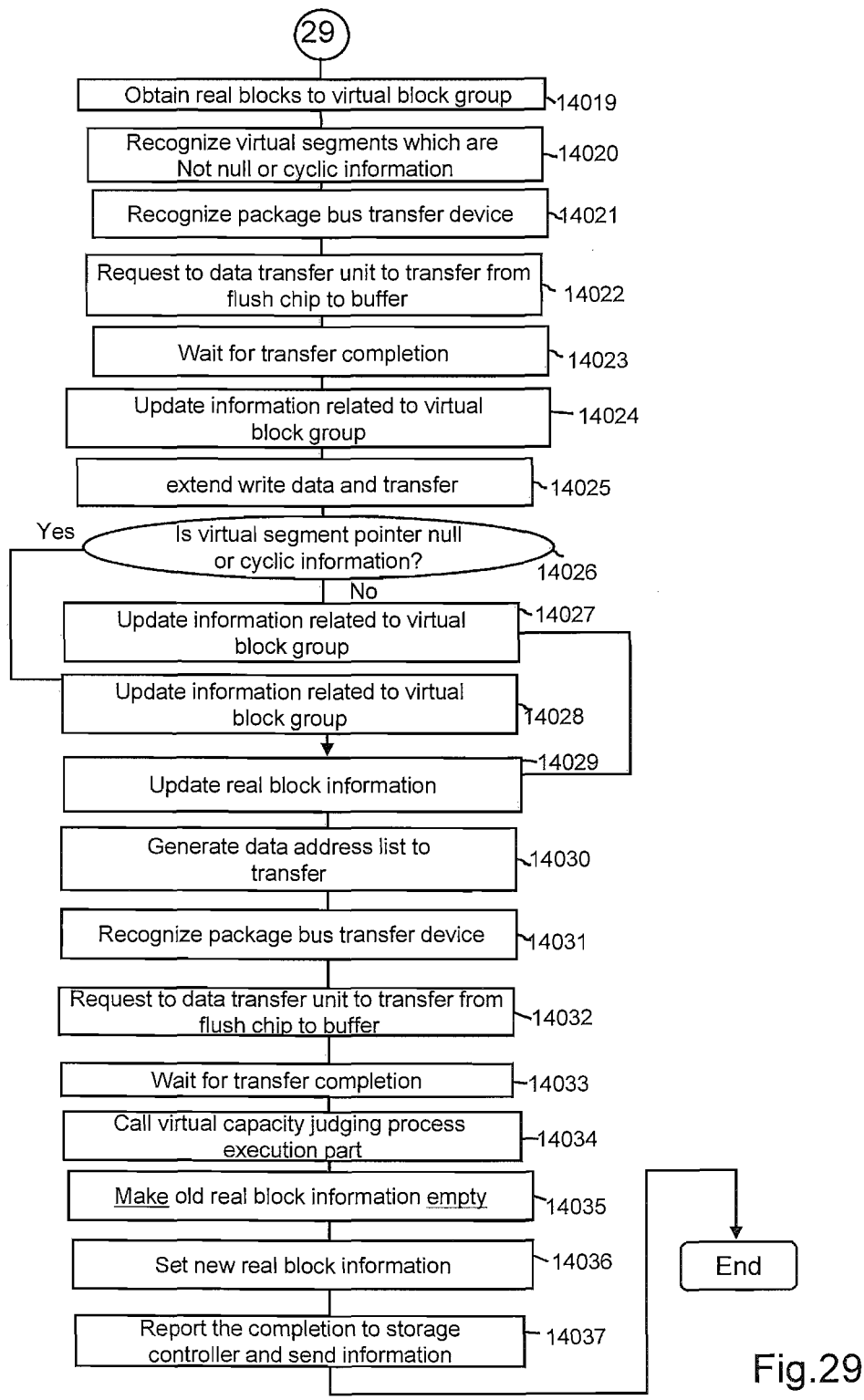
FIG. 29 is a diagram showing the remainder of the flow of processing for the data write process execution part in the example of the present invention.

FIGS. 28 and 29 are the flows of processing of the data write process execution part 12100. The data write process execution part 12100 is executed when the flash package 230 receives a write request from the storage controller 200. Furthermore, the flows of processing of FIGS. 28 and 29 shown in this example are for writing data stored in one virtual block group. However, the present invention will still be valid even in a case where the data of a plurality of virtual block groups is written in accordance with a write request. Furthermore, the flow of processing of FIG. 28 is the processing flow when data is written in virtual segment units. However, the present invention will be valid even in a case where the write request is such that data from a portion of the virtual segment is to be written.

Step 14000: The data write process execution part 12100 computes the corresponding virtual block group and the relative address of the virtual block group to be accessed based on the write-target address specified in the received write request and the package block capacity 3005. This makes it possible to identify the virtual block information 3200 corresponding to the write-destination virtual block group. Furthermore, the corresponding virtual segment is identified from the relative address inside the virtual block group. The address in the real block in which this virtual segment is stored (allocated) is identified based on the virtual segment address pointer 3205 corresponding to this virtual segment.

Step 14001: The data write process execution part 12100 stores write data conforming to the write request in the buffer 330. Furthermore, the data write process execution part 12100 instructs the compression extension circuit 360A to carry out compression at this time. The compressed write data is stored in the buffer 330.

Step 14002: The data write process execution part 12100 identifies the initial real block information pointer 3202 of the virtual block information 3200 corresponding to the write-destination virtual block group. A check is performed to determine whether or not this value is NULL, that is, whether a real page has been allocated. In a case where a real page has been allocated, the data write process execution part 12100 jumps to Step 14005.

Step 14003: The data write process execution part 12100 allocates an empty real block to the write-destination virtual block group. The real block allocated at this time is one which has undergone a delete process and is not storing any data. The data write process execution part 12100 refers to the number of empty real blocks in chip 3103 of each of the chip information 3100, and decides the flash chip 300 real block to be allocated. Thereafter, the data write process execution part 12100 refers to the empty real block information pointer 3400 of the flash chip 300 that has been decided, and sets the initial empty real block pointer 3302 of the virtual block information 3200 corresponding to the relevant virtual block group to show the first real block information 3300. In accordance with this, the initial real block is allocated to the virtual block group. Furthermore, the data write process execution part 12100 updates the empty real block information pointer 3400 to show the next real block information 3300 (the real block information 3300 denoted by the empty real block pointer 3302 in the real block information 3300 of the real block allocated to the virtual block). Furthermore, the data write process execution part 12100 sets the empty real block pointer 3302 in the real block information 3300 of the real block allocated to the virtual block to NULL. Further, the data write process execution part 12100 decreases the value denoted by the number of empty blocks in chip 3103 of the chip information 3100 corresponding to the relevant real block.

Step 14004: In addition, the data write process execution part 12100 sets the identifier of the real block allocated to the write-destination virtual block and the first address of this real block in the virtual segment address pointer 3205 corresponding to the write-destination virtual segment. The data write process execution part 12100 sets the value shown by the value identified from the compression extension circuit 360A (the amount of compressed write data) in the amount of compressed virtual segment data 3206 corresponding to the write-destination virtual block group. Furthermore, the data write process execution part 12100 sets the same value in the amount of compressed and stored data 3204. In addition, the data write process execution part 12100 adds the same value to the value denoted by the amount of compressed and stored package data 3007. Additionally, the data write process execution part 12100 sets the virtual segment capacity that will be the target for the amount of write data in the amount of stored data 3203. The data write process execution part 12100 also adds the same value to the amount of stored package data 3006 corresponding to the write-destination flash package. Furthermore, the data write process execution part 12100 stores information denoting the amount of write data received from the storage controller 200 and the amount of compressed data of this write data in a storage resource (for example, a register inside the processor 310, or the memory 320) as the value to be returned to the storage controller 200.

Step 14005: The data write process execution part 12100 instructs the bus transfer device 350 to write data from the buffer 330 to the write-destination address of the write-destination flash chip 300. Thereafter, the data write process execution part 12100 jumps to Step 14014.

Step 14006: The data write process execution part 12100 refers to the real block identifier 3301 of the real block information 3300 shown by the last real block information pointer 3202 of the virtual block information 3200 corresponding to the write-destination virtual block group, and identifies the first address of the flash chip 300 from which the corresponding real block is stored.

Step 14007: The data write process execution part 12100, based on the empty capacity in real block 3304 of the real block information 3300 corresponding to write-destination real block (the real block allocated to the write-destination virtual block) and the amount of write data stored in the buffer 330, checks whether the received data can be written to an empty area of the write-destination real block. In a case where such a write is not possible, the data write process execution part 12100 jumps to Step 14016.

Step 14008: The data write process execution part 12100 determines whether the virtual segment address pointer 3205 of the write-destination virtual segment is NULL, and whether cyclic information is stored. When neither exists, the data write process execution part 12100 jumps to Step 14010.

Step 14009: When neither the NULL value nor cyclic information exist, the data write process execution part 12100 adds a value K, which is obtained by subtracting the value denoted by the amount of compressed virtual segment data 3206 from the value denoted by the relevant compression extension circuit 360A, to the value denoted by the amount of compressed and stored data 3204. In addition, the data write process execution part 12100 adds the same value K to the value denoted by the amount of compressed and stored package data 3007. Thereafter, the data write process execution part 12100 sets the value denoted by the compression extension circuit 360A in the value denoted by the amount of compressed virtual segment data 3206. Furthermore, the data write process execution part 12100 stores 0 as the amount of write data that was written this time, and the value, which was added to the value denoted by the amount of compressed virtual segment data 3206 as the amount of compressed data, in a storage resource (for example, a register inside the processor 310, or the memory 320) as values to be returned to the storage controller 200. Thereafter, the data write process execution part 12100 jumps to Step 14012.

Step 14010: When the NULL value and cyclic information exist, the data write process execution part 12100 adds the value denoted by the relevant compression extension circuit 360 to the amount of compressed and stored data 3204. In addition, the data write process execution part 12100 adds the same value to the amount of compressed and stored package data 3007. Thereafter, the data write process execution part 12100 sets the value denoted by the compression extension circuit 360 in the amount of compressed virtual segment data 3206. Furthermore, the data write process execution part 12100 stores the amount of pre-compression data received from the storage controller 200 with respect to the amount of write data written this time and the value denoted by the relevant compression extension circuit 360 with respect to the compressed data in a storage resource (for example, a register inside the processor 310, or the memory 320) as values to be returned to the storage controller 200.

Step 14011: The data write process execution part 12100 subtracts the amount of write data received this time (the post-compression value) from the value denoted by the empty capacity in real block 3304 corresponding to the write-destination real block. The data write process execution part 12100 sets the last real block information pointer 3202 of the virtual block information 3200 corresponding to the write-destination virtual block group and the identified relative address in the virtual segment address pointer 3205 corresponding to the write-destination virtual segment.

Step 14012: The data write process execution part 12100 identifies the package bus 340 to which the relevant flash chip 300 is coupled on the basis of the chip information 3100 corresponding to the flash chip 300, which is to store the write data, and identifies the bus transfer device 350 coupled to this bus 340.

Step 14013: The data write process execution part 12100 instructs the bus transfer device 350 identified in Step 14012 to write the write data from the buffer 330 to the write-destination address of the write-destination flash chip 300.

Step 14014: Thereafter, the data write process execution part 12100 waits for the write to be completed.

Step 14015: The data write process execution part 12100 sends a completion report to the effect that the write request is complete to the storage controller 200, and ends the processing. This completion report may comprise information denoting the amount of pre-compression write data and the amount of compressed write data.

Step 14016: This step is executed in a case where the amount of write data is larger than the empty capacity of the write-destination real block. In this step, the data write process execution part 12100 does not allocate a real block in a case where (m+1) real blocks are allocated to the write-destination virtual block group. In this case, the data write process execution part 12100 jumps to Step 14019, which is shown in FIG. 29.

Step 14017: In this step, an empty real block is allocated to the write-destination virtual block group. Furthermore, it is supposed that the real block allocated here is a real block that has undergone a delete process (a real block in which valid data is not stored). The data write process execution part 12100 refers to the number of empty real blocks in chip 3103 of the respective chip information 3100, and decides the flash chip 300 real block to be allocated. Thereafter, the data write process execution part 12100 refers to the empty real block information pointer 3400 of the corresponding flash chip 300, and has the first NULL empty real block pointer 3302 of the relevant virtual block group management information denote the first real block information 3300. A new real block is allocated to the virtual block group in accordance with this. Furthermore, the data write process execution part 12100 has the empty real block information pointer 3400 denote the next real block information 3300 (the real block information 3300 denoted by the empty real block pointer 3302 inside the real block information 3300 of the real block allocated to the virtual block), and, in addition, sets the empty real block pointer 3302 inside the real block information 3300 of the real block allocated to the virtual block to NULL. Furthermore, the data write process execution part 12100 decreases the value of the number of empty blocks in chip 3103 of the chip information 3100 corresponding to the relevant block.

Step 14018: The data write process execution part 12100 decides the address of the flash chip 300 in which to store the data based on the real block information 3300 denoted by the real block information pointer 3202 newly allocated to the relevant virtual block information 3200, and the real block identifier 3301 of the real block information 3300 denoted by the immediately previous real block information pointer 3202. Thereafter, the data write process execution part 12100 jumps to Step 14008.

Step 14019: In this step, a different real block is allocated to the relevant virtual block group. The reason for allocating a different real block is to reduce the bias of the number of real block deletions. This process is called the wear leveling process. The number of real blocks to be allocated at this time, for example, is determined based on a value obtained by adding the value shown by the compression extension circuit 360A to the value denoted by the amount of compressed and stored data 3206 corresponding to the write-destination virtual block group. In this step, the data write process execution part 12100 calls a wear leveling process execution part (for example, a not-shown program, which is executed by the processor 310 inside the flash package 230) and determines the real block by using the number of real blocks required as the input value. The data write process execution part 12100 receives real block information 3300 address(es) of real block(s) for storing write data proportional to a number equivalent to the input value from the wear leveling process execution part. It is supposed that this real block has been deleted and is in a state in which data can be written directly. Furthermore, in this example, since it is supposed that the wear leveling process execution part, for example, is premised on known technology like that of Patent Literature 1, this execution part will not be explained in particular detail here.

Step 14020: The data write process execution part 12100 extends all the compressed data in the relevant virtual block group one time at this point, and reads this data to the buffer 330. For this reason, the data write process execution part 12100 refers to all of the virtual segment addresses 3205 and corresponding amounts of compressed virtual segment data 3206, which are neither NULL values nor cyclic information. Based on these values and the real block information 3300, the data write process execution part 12100 creates an address list in virtual segment address order showing what amount is to be transferred to the buffer 330 from which address in which flash chip 300. However, a real segment, which includes a portion of the required virtual segment, also becomes the read target.

Step 14021: The data write process execution part 12100 identifies the package bus 340 to which the relevant flash chip 300 is coupled and identifies the corresponding bus transfer device 350 based on the chip information 3100 corresponding to the flash chip 300 recognized in Step 14020.

Step 14022: The data write process execution part 12100 instructs the bus transfer device 350 identified in Step 14021 to read data from locations conforming to the address list created in Step 14020 (flash chip 300 addresses) to the buffer 330. Furthermore, the data write process execution part 12100 instructs the compression extension circuit 360B to extend the data at this time.

Step 14023: Thereafter, the data write process execution part 12100 waits for the read to the buffer 330 to be completed.

Step 14024: The data write process execution part 12100 updates in the virtual block information 3200 all virtual segment address pointers 3205 other than the virtual segment address pointers 3205, which are storing either NULL values or cyclic information (hereinafter will be called valid virtual segment address pointers 3205). The data write process execution part 12100 sets the address of the initially allocated real block as the block address and sets the first address of this real block as the relative address in the initial valid virtual segment address pointer 3205. With respect to the next valid virtual segment address pointer 3205, as a rule, the data write process execution part 12100 sets the block address denoted by the previous valid virtual segment address pointer 3205 as the block address and sets a value (a cumulative value) obtained by adding the value (relative address) denoted by the previous valid compressed virtual segment address pointer 3206 as the relative address. In a case where the relative address exceeds the range of the real page, a value obtained by subtracting a value equivalent to the real page range from this value (the value that exceeds the real page range) is set as the relative address, and the address of the real page allocated next is set as the page address. After setting the value of the last valid virtual segment address pointer 3205, the data write process execution part 12100 adds the value denoted by the corresponding amount of compressed virtual segment data 3206 to the value of the relative address related to the last valid virtual segment address pointer 3205. In a case where the value H computed in this way does not exceed the real page capacity, a value obtained by subtracting this computed value from the real page capacity is set in the empty capacity in real block 3304 of the real block information 3300 corresponding to the block address of the last valid virtual segment address pointer 3205, and, in addition, the address of the relevant real block is set as the block address in the virtual segment address pointer 3205 corresponding to the relevant write request. In addition, in a case where the computed value H exceeds the real page capacity, a value obtained by subtracting this computed value H from a value two times that of the real page capacity is set in the empty capacity in real block 3304 of the real block information 3300 shown by the last real page address pointer.

Step 14025: The data write process execution part 12100 extends and writes the write data received from the storage controller 200 to the area subsequent to the data transferred in Step 14023.

Step 14026: The data write process execution part 12100 determines whether the virtual segment address pointer 3205 of the relevant virtual segment is storing either a NULL value or cyclic information. In a case where either of these exists, the data write process execution part 12100 jumps to Step 14028.

Step 14027: In a case where neither exists, the data write process execution part 12100 adds a value J obtained by subtracting the amount of compressed virtual segment data 3206 from the value shown by the compression extension circuit 360A, which was used when the write data was transferred from the storage controller 200, to the amount of compressed and stored data 3204. In addition, the data write process execution part 12100 adds the same value J to the value denoted by the amount of compressed and stored package data 3007. Thereafter, the data write process execution part 12100 sets the value shown by the compression extension circuit 360A in the amount of compressed virtual segment data 3206. Furthermore, the data write process execution part 12100 stores 0 as the amount of write data that was written this time, and the value, which was obtained by adding the amount of compressed data to the amount of compressed virtual segment data 3206 as the amount of compressed data in a storage resource (for example, a register or the memory 320) as values to be returned to the storage controller 200. Thereafter, the data write process execution part 12100 jumps to Step 14029.

Step 14028: In a case where either the NULL value or cyclic information exist, the data write process execution part 12100 adds a value L, which is shown by the compression extension circuit 360A used when the write data was transferred from the storage controller 200, to the value denoted by the amount of compressed and stored data 3204 corresponding to the write-destination virtual block group. In addition, the data write process execution part 12100 adds the same value L to the amount of compressed and stored package data 3007. Thereafter, the data write process execution part 12100 sets the same value L in the amount of compressed virtual segment data 3206. Furthermore, the data write process execution part 12100 stores a value denoting the amount of pre-compression data received from the storage controller 200 as the amount of write data written this time and the value L shown by the relevant compression extension circuit 360A as the amount of compressed data in a storage resource (for example, a register or memory) as values to be returned to the storage controller 200.

Step 14029: The data write process execution part 12100 adds the value of the corresponding amount of compressed virtual segment data 3206 to the relative address among the values of the last valid virtual segment address pointer 3205. The value computed in this way is M. In a case where this computed value M does not exceed the real block capacity, the data write process execution part 12100 sets the real block address shown by the last valid virtual segment address pointer 3205 in the virtual segment address pointer 3205 corresponding to the relevant write requests as the block address, and sets this computed value M as the relative address. In addition, in a case where this computed value M exceed the real block capacity, the data write process execution part 12100 sets a value obtained by subtracting this computed value M from the real block capacity in the empty capacity in real block 3304 of the last real block information 3300. In addition, in a case where this computed value M exceeds the real block capacity, the data write process execution part 12100 sets a value obtained by subtracting this computed value M from a value two times that of the real block capacity in the empty capacity in real block 3304 of the last real block management information 3300.

Step 14030: Next, the data write process execution part 12100, based on the real block identifier 3301 of the real block information 3300 corresponding to a newly allocated real block, identifies the address of the flash chip 300 to which this real block corresponds and creates a transfer-instruction address list.

Step 14031: The data write process execution part 12100, based on the chip information 3100 corresponding to the flash chip 300, which is to store the write data identified in 14030, identifies the package bus 340 to which the relevant flash chip 300 is coupled, and identifies the bus transfer device 350 coupled to this bus 340.

Step 14032: The data write process execution part 12100 instructs the bus transfer device 350 identified in Step 14031 to write data from the buffer 330 to the address(es) of the flash chip 300 in accordance with the address list created in Step 14030. The data write process execution part 12100 instructs the compression extension circuit 360B to perform compression at this time.

Step 14033: Thereafter, the data write process execution part 12100 waits for the write from the buffer 330 to be completed.

Step 14034: Thereafter, the data write process execution part 12100 calls the virtual capacity judging execution part 12500 to check whether the virtual capacity of the write-destination package in Step 14033 needs to be changed.

Step 14035: In this step, the allocated real block is emptied. First, the data write process execution part 12100 carries out a delete process with respect to the originally allocated real block. When this is complete, the data write process execution part 12100 next sets the address of the real block information 3300, which was shown by the empty real block information pointer 3400, to the empty real block pointer 3302 of the real block information 3300 corresponding to the originally allocated real block, and sets the address of the real block information 3300 corresponding to the originally allocated real block in the empty real block information pointer 3400. In addition, information other than the empty real block pointer 3302 of the real block information 3300 corresponding to the originally allocated real block is set to the NULL value. Furthermore, the data write process execution part 12100 sets the real block information pointer 3202 of the corresponding virtual block information 3200 to the NULL state. This Step 14035 is repeated in accordance with the number of real blocks allocated to the relevant virtual block group.

Step 14036: In this step, a real block is allocated anew to the virtual block group. Specifically, for example, the data write process execution part 12100 causes a number of real block information pointers 3202 of the virtual block information 3200 proportional to the number of virtual blocks configuring the write-destination virtual block group to show the real block information 3300 of the newly allocated real block.

Step 14037: The data write process execution part 12100 reports to the storage controller 200 that the write request has ended. Furthermore, in a case where, based on the execution results of the virtual capacity judging execution part 12500, the data write process execution part 12100 has detected that the virtual capacity of the relevant flash package 230 will be changed, the data write process execution part 12100 reports information denoting the new virtual capacity (either the post-change virtual capacity or the difference with the current virtual capacity) to the storage controller 200. Furthermore, the data write process execution part 12100 also reports information denoting the pre-compression amount and the compressed amount of the write data to the storage controller 200.

Figure 30:
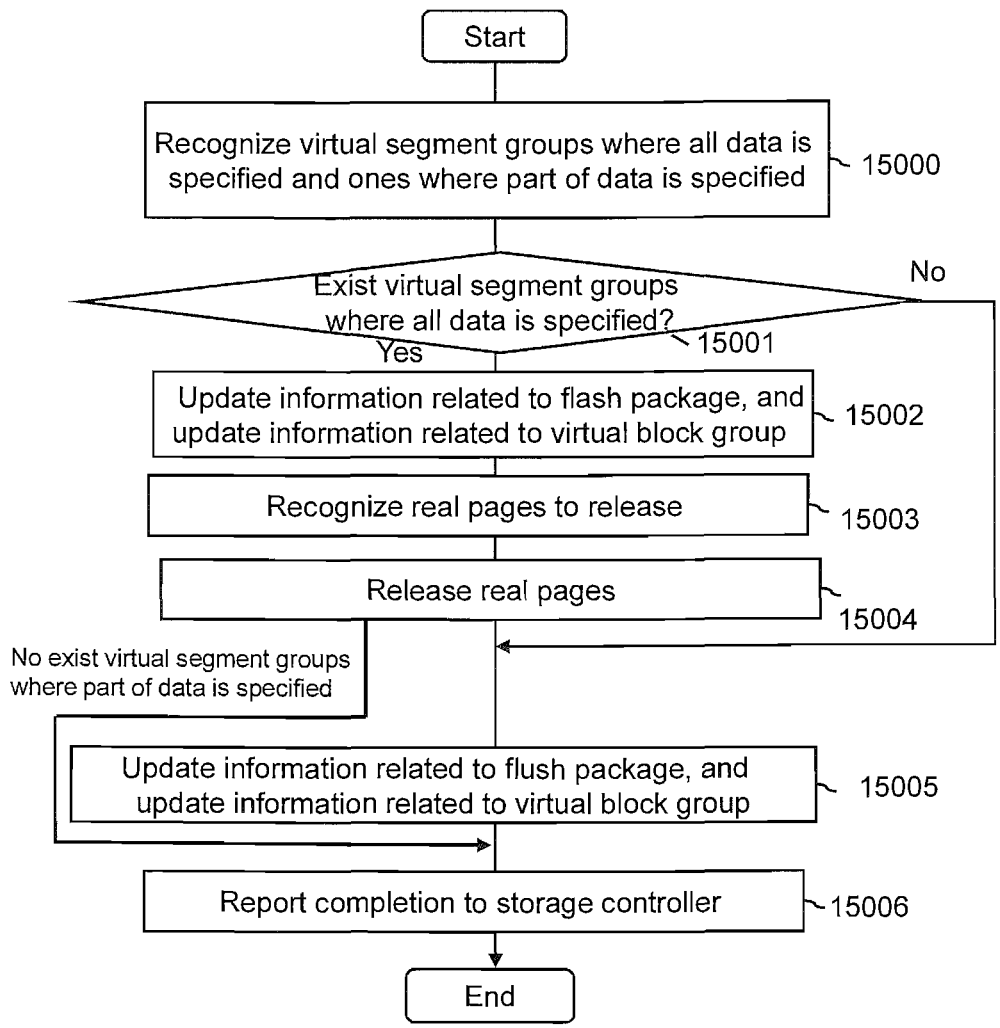
FIG. 30 is a diagram showing the flow of processing for a real block release process execution part in the example of the present invention.

FIG. 30 is the flow of processing of the virtual block release process execution part 12200. The virtual block release process execution part 12200 is executed when the flash package 230 receives a release request (a request to release an allocated real block) specifying a range of areas (a collection of virtual segments) from the storage controller 200.

Step 15000: The virtual block release process execution part 12200 identifies a range (a range in a virtual block group) specified for release based on a range of areas specified in the received release request and the package block capacity 3005. The range identified at this time can be the entire virtual block group or a portion of the virtual segments in the virtual block group. Furthermore, sorting may be carried out for each virtual block group comprising the specified range (virtual segments). The virtual block release process execution part 12200 also clears (sets to 0) a value showing the difference (change) between the amount of stored data and the amount of compressed and stored data, which is disposed corresponding to the specified area range and is to be returned to the storage controller 200.

Step 15001: The virtual block release process execution part 12200 jumps to Step 15005 in a case where a virtual block group, which is specified in its entirety, does not exist.

Step 15002: The virtual block release process execution part 12200 totals the amount of stored data 3203 of all the virtual block groups specified in the release request, and, in addition, totals the amount of compressed and stored data 3204 of all the virtual block groups specified in the release request. The virtual block release process execution part 12200 adds the value of each total to the respectively corresponding value (the amount of stored data and the amount of compressed and stored data) to be returned to the storage controller 200. In addition, the virtual Nock release process execution part 12200 subtracts the total value concerning the amount of stored data 3203 from the amount of stored package data 3006 and subtracts the total value concerning the amount of compressed and stored data 3204 from the amount of compressed and stored package data 3007. Thereafter, the virtual block release process execution part 12200 clears the amount of stored data 3203 and the amount of compressed and stored data 3204, sets a value signifying that cyclic information is specified for all the virtual segment address pointers 3205, and, in addition sets this cyclic information in all of the amounts of compressed virtual segment data 3206 with respect to all of the virtual block groups specified in the release request.

Step 15003: The virtual block release process execution part 12200 carries out a release process for real blocks corresponding to the real block information 3300 shown by the real block information pointer 3202 of the virtual block information 3200 corresponding to all the virtual block groups that have been specified. For this reason, the virtual block release process execution part 12200 analyzes the real block identifiers 3301 of all the relevant real block information 3300, and identifies the addresses of the flash chips 300 in which the real blocks to be released are being stored.

Step 15004: In this step, all of the real blocks allocated to all of the relevant virtual block groups are emptied. The targeted real blocks are the real blocks that were identified in Step 15003, but since the processing is the same as that of Step 14035 of FIG. 29, an explanation will be omitted here. However, the processing of Step 14035 is related to a single virtual block group, but the processing of Step 14035 is executed here in proportion to the number of relevant virtual block groups. Thereafter, the virtual block release process execution part 12200 jumps to Step 15006 in a case where there is no virtual segment group for which a partial virtual segment release has been instructed.

Step 15005: This step is processing with respect to all partially specified virtual block groups rather than entire virtual block groups. The virtual block release process execution part 12200 totals the amount of stored data 3203 of all the virtual block groups specified in the release request, and, in addition, totals the amount of compressed and stored data 3204 of all the virtual block groups specified in the release request. The virtual block release process execution part 12200 adds the respective total values to the respective corresponding values (the amount of stored data and the amount of compressed and stored data) to be returned to the storage controller 200. In addition, the virtual block release process execution part 12200 subtracts the total value related to the amount of stored data 3203 from the amount of stored package data 3006, and in addition, subtracts the total value related to the amount of compressed and stored data 3204 from the amount of compressed and stored package data 3007. The virtual block release process execution part 12200 computes the total value of the number of all valid virtual segment address pointers 3205 and corresponding amounts of compressed virtual segment data 3206 among the specified virtual segment address pointers 3205 for each corresponding real page (each real page comprising the specified virtual block groups) and each specified virtual block group with respect to all of the virtual block groups. The virtual block release process execution part 12200 adds both computed values to a corresponding value provided for each real page to be returned to the storage controller 200. In addition, the virtual block release process execution part 12200, with respect to the amount of stored data, subtracts the computer value (the sum of the total value of the amounts of stored data 3203 and the value (the amount of stored data) to be returned to the storage controller 200) from the amount of stored package data 3006, and with respect to the amount of compressed and stored data, subtracts the computed value (the sum of the total value of the amounts of compressed and stored data 3204 and the value (the amount of compressed and stored data) to be returned to the storage controller 200) from the amount of compressed and stored package data 3007. In addition, the virtual block release process execution part 12200 subtracts the amount of stored data and the amount of compressed and stored data, which were computed, from the amount of stored data 3203 and the amount of compressed and stored data 3204 of the relevant virtual block groups for each virtual block group. Lastly, the virtual block release process execution part 12200 changes the values of all the valid virtual segment address pointers 3205 among the specified virtual segment address pointers 3205 to a value showing that cyclic information has been set, and, in addition, sets the cyclic information in the corresponding amounts of compressed virtual segment data 3206. Furthermore, simply storing the fact that the cyclic information has been set in the release-instructed virtual segment here results in a real block release not being carried out. However, when another real block is allocated to the relevant virtual block group and valid data is written to the allocated real block (the processing of Steps 14019 through 14033 of the data write process execution part 12100), the information stating that cyclic information is being stored results in data not being written to the relevant virtual segment, thereby enabling the capacity of the stored data to be reduced. Also, in this example, this storing of the cyclic information does not trigger the execution of the process for allocating another segment to the relevant virtual segment group, but the present invention will be valid even in a case where this storing of cyclic information does trigger the execution of the process (the processing of Steps 14019 through 14033 of the data write process execution part 12100) for allocating another segment, and the capacity of the stored data is immediately reduced.

Step 15006: The virtual block release process execution part 12200 reports the amount of stored data and the amount of compressed and stored data computed in Step 15002 and in Step 15005 to the storage controller 200. The virtual block release process execution part 12200 issues a release request completion report to the storage controller 200. This completion report may comprise information denoting the amount of stored data and the amount of compressed and stored data computed in Step 15002 and Step 15005.

Figure 31:
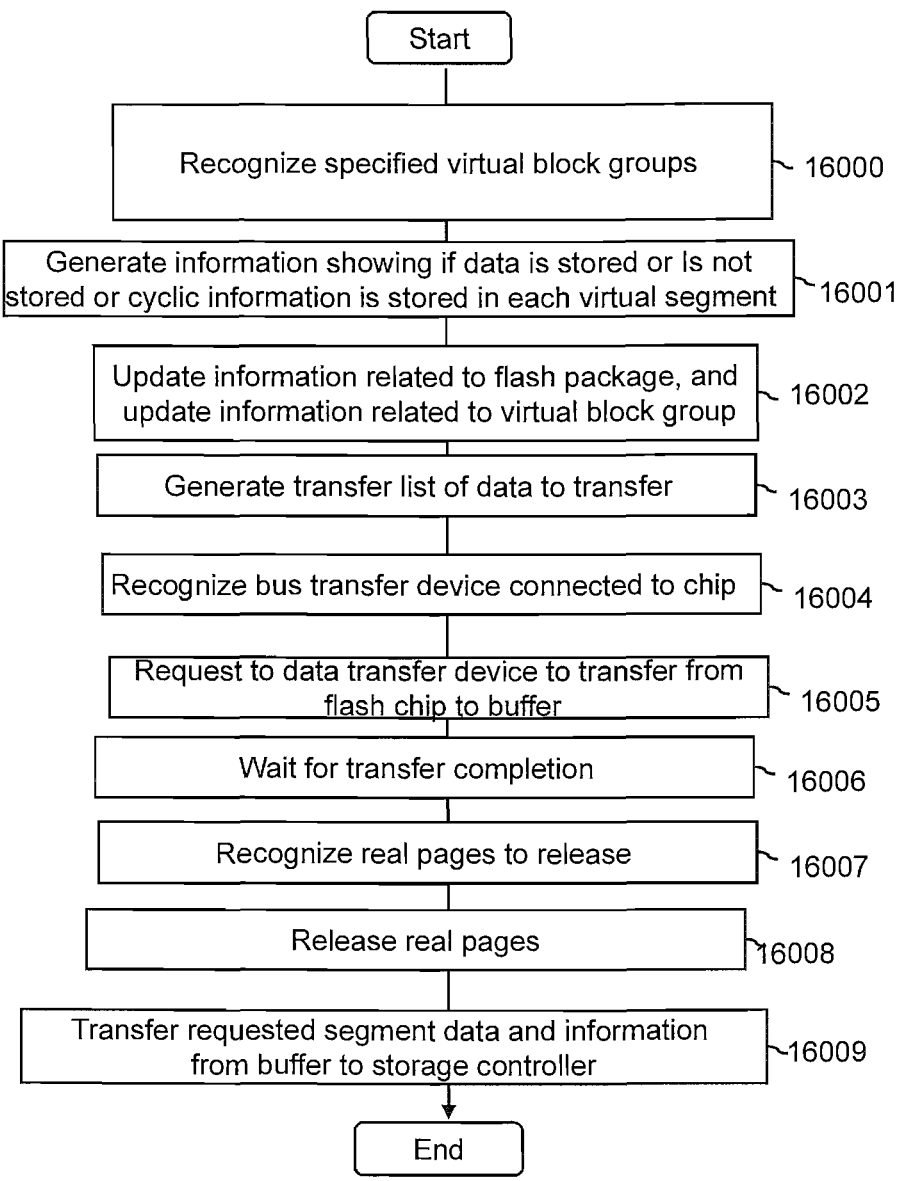
FIG. 31 is a diagram showing the flow of processing for a virtual block transfer process execution part in the example of the present invention.

FIG. 31 is the flow of processing of the virtual block transfer process execution part 12300. The virtual block transfer process execution part 12300 is executed when the flash package 230 receives a request to transfer data stored in a collection of specified virtual segments (a virtual block transfer request) from the storage controller 200. Furthermore, since the request is in real page units, it is supposed here that the request is not for the transfer of a portion of the segments of the virtual block group. Furthermore, since the real block which had stored the sent data is released, the processing will differ from that of the virtual block release process execution part 12200 of FIG. 30 in that the data that was stored in the real block is sent to the storage controller 200. For this reason, an explanation of FIG. 31 will be given while citing the respective steps of the flow of processing of FIG. 30.

Step 16000: The virtual block transfer process execution part 12300 computes a collection of virtual block groups specified by a virtual block transfer request.

Step 16001: The virtual block transfer process execution part 12300 refers to the corresponding virtual segment address pointer 3205 with respect to all the virtual segments of each virtual block group for all the virtual block groups specified, and sets status information (information showing whether data is not stored (NULL), cyclic information is set, or data is stored) and a value denoted by the amount of compressed virtual segment data 3206 as the value to be returned to the storage controller 200.

Step 16002: The virtual block transfer process execution part 12300 sets the amount of stored data 3203 and the amount of compressed and stored data 3204 of each virtual block group for all the virtual block groups specified as the values to be returned to the storage controller 200. Furthermore, the virtual block transfer process execution part 12300 finds the respective total values of the amount of stored data 3203 and the amount of compressed and stored data 3204 of these virtual block groups, and sets the respective total values as the values to be returned to the storage controller 200. In addition, the virtual block transfer process execution part 12300 subtracts the respective total values from the amount of stored package data 3006 and the amount of compressed and stored package data 3007. Thereafter, the virtual block transfer process execution part 12300 clears the amount of stored data 3203, the amount of compressed and stored data 3204, all the virtual segment address pointers 3205, and the amount of compressed virtual segment data 3206.

Step 16003: The virtual block transfer process execution part 12300, based on the virtual segment address pointers 3205 and corresponding amounts of compressed virtual segment data 3206, which show that the virtual segment address pointers 3205 of all the virtual segments specified store data, creates an information list showing the addresses in which are stored data, which is stored inside the relevant virtual block groups and is to be sent to the storage controller 200, and the transfer lengths thereof. However, the real segment, which includes a portion of the required virtual segment, will also become the read target.

Step 16004: The virtual block transfer process execution part 12300 accesses the chip information 3100 corresponding to the flash chip 300 in which the real block allocated to the specified virtual segment is stored, identifies the package bus 340 to which the relevant flash chip 300 is coupled, and identifies the corresponding bus transfer device 350.

Step 16005: The virtual block transfer process execution part 12300 instructs the bus transfer device 350 identified in Step 16004 to transfer the data to the buffer 330 from the addresses in accordance with the information list created in Step 16004. The virtual block transfer process execution part 12300 instructs the compression extension circuit 360B to extend the data at this time.

Step 16006: The virtual block transfer process execution part 12300 waits for the transfer to be completed.

Step 16007: Since the processing in this step is the same as that of Step 15003, an explanation will be omitted.

Step 16008: Since the processing in this step is the same as that of Step 15004, an explanation will be omitted.

Step 16009: The virtual block transfer process execution part 12300 sends the data stored in the buffer 330 to the storage controller 200. First, the virtual block transfer process execution part 12300 sends status information (information showing whether data is stored, cyclic information is set, or data is not stored) and information denoting the amount of compressed data for each virtual segment. Next, the virtual block transfer process execution part 12300 sends to the storage controller 200 the change values of the amount of stored data and the amount of compressed and stored data corresponding to the virtual block group, and, in addition, change values of the amount of stored data and the amount of compressed and stored data for all the data, and lastly, the data of the effective virtual segment selected from among all the data stored in the buffer 330. Processing ends with the above.

Figure 32:
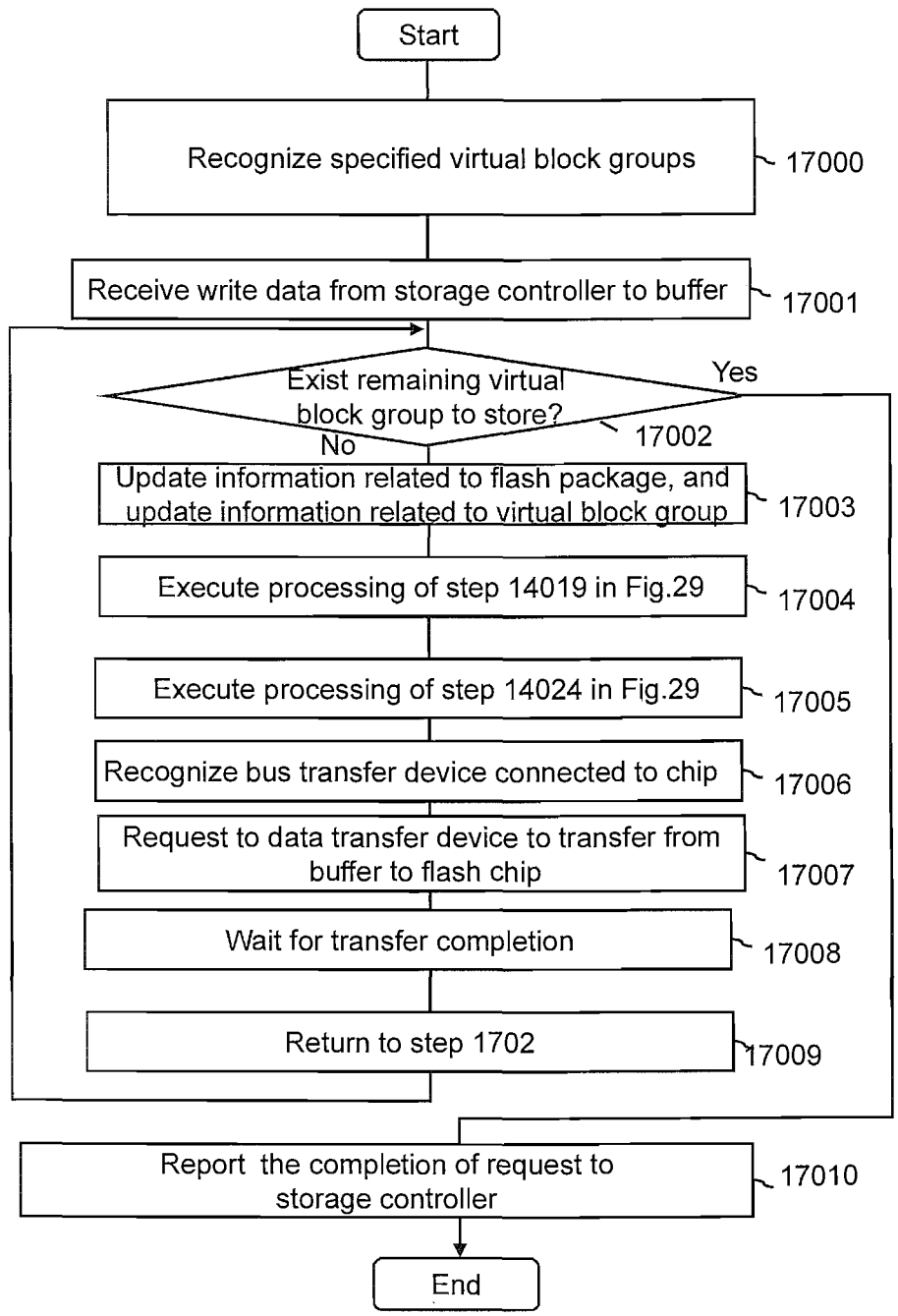
FIG. 32 is a diagram showing the flow of processing for a virtual block store process execution part in the example of the present invention.

FIG. 32 is the flow of processing of the virtual block store process execution part 12400. The virtual block store process execution part 12400 is executed upon receiving a storage request (a request to respectively allocate real blocks to specified virtual block groups and to store data sent from the storage controller 200). The flow of data is the reverse of that of the virtual block transfer process execution part 12300, but since there are numerous points shared in common, an explanation will be given while citing the respective steps of the flow of processing of FIG. 31.

Step 17000: This step is the same as Step 16000. The virtual block store process execution part 12400 identifies a target virtual block group from a collection of virtual segments for which storage has been specified.

Step 17001: The virtual block store process execution part 12400 receives the following information from the storage controller 200, and stores this information in the buffer 330:

(*) Values showing whether data is stored or not, or whether cyclic information is set in each virtual segment in the collection of specified virtual segments; and (*) a value showing the amount of compressed data.

Next, the virtual block store process execution part 12400 receives change values for the amount of stored data and the amount of compressed and stored data for each virtual block group. In addition, the virtual block store process execution part 12400 receives change values for all the amounts of stored data and amounts of compressed and stored data. Lastly, the virtual block store process execution part 12400 receives the data to be stored in the virtual segments, and instructs the compression extension circuit 360A to execute data compressing processing and to store the compressed data in the buffer 330 at this time. Furthermore, the virtual block store process execution part 12400 adds the change values of the amounts of stored data and the amounts of compressed and stored data of all the data to the amount of stored package data 3006 and the amount of compressed and stored package data 3007. Next, the virtual block store process execution part 12400 sorts the specified virtual segments in each virtual block group.

Step 17002: This step is the same as Step 16002. The virtual block store process execution part 12400 searches for a virtual block group, which has been instructed to store data. In a case where no more exist, the virtual block store process execution part 12400 jumps to Step 17010.

Step 17003: The virtual block store process execution part 12400 stores the change values of the amount of stored data and the amount of compressed and stored data with respect to the relevant virtual block group in the amount of stored data 3203 and the amount of compressed and stored data 3204 of the corresponding virtual block information 3200. Furthermore, the virtual block store process execution part 12400 sets in the virtual segment address pointer 3205 a value showing whether the data, which was received with respect to the corresponding virtual segments, is stored or not, or whether cyclic information is set. In a case where the value, which shows that data is being stored, has been received, the virtual block store process execution part 12400 sets the corresponding amount of compressed and stored data in the amount of compressed virtual segment data 3206.

Step 17004: The real blocks are allocated to the relevant virtual block group here. The number of allocated real blocks is determined on the basis of the amount of compressed and stored data 3204 of the relevant virtual block information 3200. The required number of real blocks is allocated at this point. Since this processing was shown in Step 14019 of FIG. 29, an explanation will be omitted.

Step 17005: The virtual block store process execution part 12400 updates the virtual segment address pointer(s) 3205 showing that data is stored in the relevant virtual block information 3200. This is the same as Step 14024, and as such, an explanation will be omitted.

Step 17006: The virtual block store process execution part 12400 identifies the package bus 340 to which the relevant flash chip 300 is coupled, and identifies the corresponding bus transfer device 350 based on the chip information 3100 corresponding to the flash chip 300 in which the data inside the virtual segment is stored.

Step 17007: The virtual block store process execution part 12400 instructs the bus transfer device 350 identified in Step 17006 to store the data of the entire relevant virtual block group from the addresses of the flash chip 300 to the buffer 330.

Step 17008: The virtual block store process execution part 12400 waits for the transfer to be completed.

Step 17009: The virtual block store process execution part 12400 returns to Step 17002.

Step 17010: The virtual block store process execution part 12400 reports the completion of the processing request to the storage controller 200, and ends the above processing.

Figure 33:
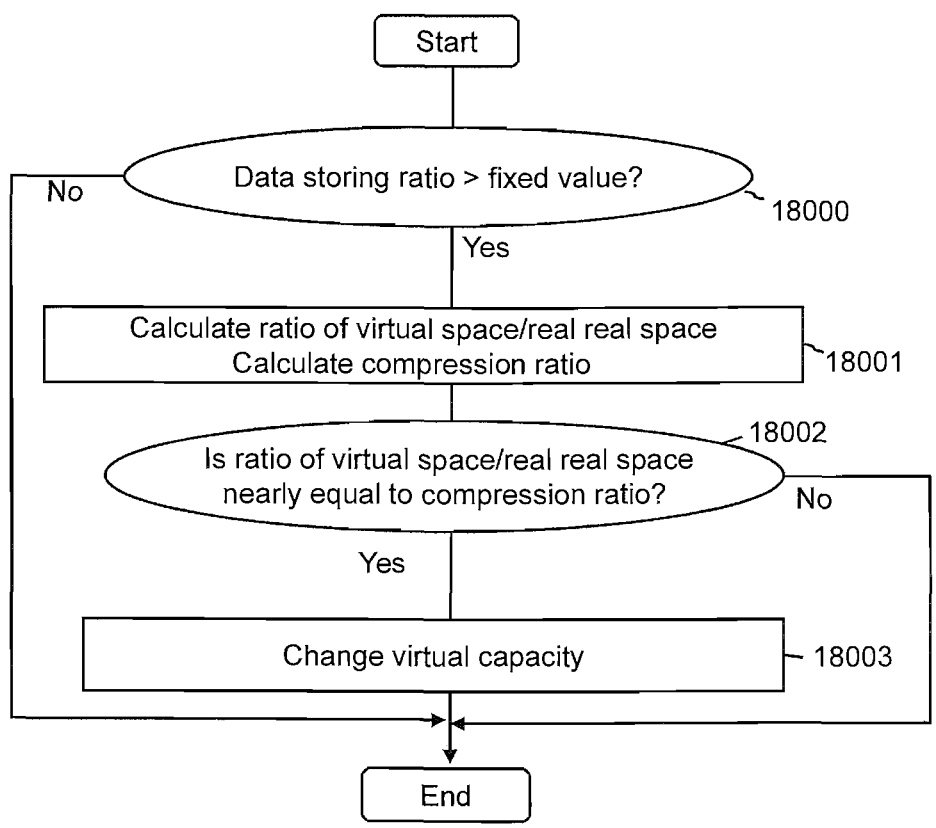
FIG. 33 is a diagram showing the flow of processing for a virtual capacity determination process part in the example of the present invention.

FIG. 33 is the flow of processing of the virtual capacity judging execution part 12500. The virtual capacity judging execution part 12500 discerns the compression ratio and determines whether it is necessary to adjust the virtual capacity of the relevant package 230. In a case where the determination is that adjustment is required, the virtual capacity judging execution part 12500 decides and sets this capacity in the virtual package capacity 3002. In addition, the virtual capacity judging execution part 12500 returns this capacity and the fact that the capacity has changed to the call source.

Step 18000: The virtual capacity judging execution part 12500 computes the ratio amount of stored package data 3006/virtual package capacity 3002. The computed ratio will be called P. In a case where ratio P is equal to or less than Q (Q, for example, is a much smaller value than P), the virtual capacity is not adjusted, and the processing returns to the call source. This is because when the ratio P is equal to or less than Q, there is still not that much data being stored.

Step 18001: The virtual capacity judging execution part 12500 computes R=(virtual package capacity 3002/real package capacity 3003). The virtual capacity judging execution part 12500 also computes T=(amount of stored package data 3006/amount of compressed and stored package data 3007). The value T is the compression ratio.

Step 18002: The virtual capacity judging execution part 12500 compares R with T. In a case where these values are substantially equivalent (for example, in a case where the difference between R and T is less than a prescribed value), the ideal virtual package capacity 3002 is set. For this reason, the virtual capacity judging execution part 12500 decides not to perform an adjustment, and returns processing to the call source. In a case where R is larger than T (a case where the virtual capacity is too large) or a case where R is smaller than T (a case where the virtual capacity is too small), the virtual capacity judging execution part 12500 adjusts the virtual package capacity 3002.

Step 18003: The virtual capacity judging execution part 12500 adjusts the virtual capacity. The post-adjustment virtual capacity value, for example, is real package capacity 3003*T. This is the ideal value provided the compression ratio T does not change in the future. The post-adjustment virtual capacity value may be (real package capacity 3003− amount of compressed and stored package data 3007)*R+ amount of compressed and stored package data 3007*T. The virtual capacity judging execution part 12500 sets the decided value (the post-adjustment virtual capacity value) in the virtual package capacity 3002, and, in addition, notifies the call source of the virtual capacity adjustment and this decided value, and ends the processing.

According to this example, it is possible to hold performance degradation in check and to enable the storage of a capacity that is larger than the physical capacity even when using a compression function to reduce the stored data capacity in a large-scale storage system to which large numbers of flash packages mounted with large numbers of flash memories are respectively coupled.

An example of the present invention has been explained hereinabove, but this is merely an example for explaining the present invention and does not purport to limit the scope of the present invention solely to this example. The present invention can also be put into practice using a variety of other modes.

An overview of the present invention in accordance with one or more aspects thereof will be described below based on the above explanation.

A storage system comprises a plurality of flash packages and a storage controller for sending a write request (hereinafter, a lower-level write request) for write data based on data conforming to a write request from a host (hereinafter, a higher-level write request). Each flash package comprises one or more flash memories and a package controller, which is coupled to the storage controller and to one or more flash memories. Each flash memory comprises a plurality of real blocks. Each real block is configured from a plurality of real segments. This flash memory is a type of flash memory, for example, a NAND flash memory, in which data is deleted in block units and data is written and read in segment units. The package controller writes write data, which conforms to a write request from the storage controller, to the real block.

Either the storage controller or the package controller defines in the storage controller a virtual capacity that is larger than the total value of the physical capacity of the plurality of flash chips of the flash package.

Either the storage controller or the package controller compresses the write data conforming to the lower-level write request. The package controller of the flash package, which is the destination of the lower-level write request, writes compressed data, which is the compressed write data, to the real block allocated to the write-destination virtual block.

Either the storage controller or the package controller changes the virtual capacity of a flash package in accordance with the data storage status of this flash package. The data storage status is typically the above-described compression ratio. The flash package compression ratio is a value based on the total capacity of the pre-compression write data with respect to the valid compressed data stored in this flash package and the total capacity of the valid compressed data stored in this flash package. Specifically, for example, either the storage controller or the package controller manages the amount of valid compressed data written to a virtual segment and the amount of pre-compression data with respect to this valid data. The total capacity of the pre-compression write data with respect to the valid compressed data stored in the flash package is a value computed on the basis of the amount of pre-compression data with respect to the written valid data for each virtual segment provided by this flash package. The total capacity of the valid compressed data stored in the flash package is a value computed on the basis of the amount of valid compressed data stored in this flash package for each virtual segment provided by this flash package. For example, it is supposed that a real block #1 is allocated to a virtual block #1, and that the virtual block #1 comprises virtual segments #1 and #2. An explanation in which the length of the virtual segment is 8 kilobytes will be given here. It is supposed that one kilobyte of compressed data is stored in the virtual segment #1 as a result of compressing and storing the data, two kilobytes of compressed data is stored in the virtual segment #2 as a result of compressing and storing the data, and, in addition, the data in virtual segment #1 is rewritten and compressed, resulting in three kilobytes of data being stored. In this case, the valid data (latest data) of virtual segment #1 is three kilobytes of compressed data, and the valid data (latest data) of virtual segment #2 is two kilobytes of compressed data. For this reason, the total amount of the latest compressed data in real block #1 is three kilobytes+two kilobytes=five kilobytes. Furthermore, the total amount of the latest pre-compression data in real block #1 is eight kilobytes+eight kilobytes=16 kilobytes. In a case where compressed data is stored in the virtual segment like this, the amount of stored package data 3006 and the amount of compressed and stored package data 3007 are updated with respect to the flash package providing this virtual segment. The package controller sends to the storage controller compression status information (for example, information denoting the amount of compressed data written to this virtual segment and the amount of pre-compression write data with respect to this compressed data and/or information denoting the relevant write-time compression ratio computed based on these amounts) with respect to the virtual block comprising the write-destination virtual segment. The compression status information may be included in the completion report with respect to the lower-level write request.

Either the storage controller or the package controller increases the virtual capacity of this flash package in a case where the flash package compression ratio has increased. This is because it is possible to further reduce the amount of stored data, thereby raising the prospects of even more write data being stored.

Either the storage controller or the package controller decreases the virtual capacity of this flash package in a case where the compression ratio of the flash package has been decreased. This is because the amount of stored data is not reduced very much, thereby increasing the prospects that not much more write data can be stored.

Each real page comprises a plurality of virtual blocks. In a case where the storage controller increases the virtual capacity of a flash package, the number of empty real pages based on this flash package increases, and in a case where the storage controller decreases the virtual capacity of a flash package, the number of empty real pages based on this flash package decreases. In a case where there is a higher-level capacity virtualization function in addition to the lower-level capacity virtualization function like this, the virtual capacity can be increased and decreased without changing the corresponding relationship between the virtual block and the real block.

The compression of the write data is carried out for at least one of the following operations, i.e. when writing to a flash chip, when performing a reclamation process, or when transferring data between pages. The reclamation process is one that is inevitably carried out in a flash package, and since compression is carried out at the time of this process, drops in performance can be expected to be held in check.

The storage controller transfers data between flash packages from a transfer-source real page to a transfer-destination real page based on the flash package compression ratio. The storage controller makes use of management information associated with the transfer-source real page and management information associated with the transfer-destination real page. The management information, for example, may include whether data is being stored or whether cyclic information is being stored. Furthermore, in a data transfer between flash packages, the transfer-source flash package may extend (or not extend) and transfer the valid compressed data inside the real block allocated to the transfer-source real page to the transfer-destination flash package, and the transfer-destination flash package may compress (or not compress because compression has already been completed) and store the received data in the real block allocated to the transfer-destination real page. The management information corresponding to the transfer-source real page (for example, information denoting the amount of stored data and the amount of compressed and stored data) is reset, and the management information corresponding to the transfer-destination real page (for example, information denoting the amount of stored data and the amount of compressed and stored data) may be updated in accordance with the data transfer on the basis of the amount of stored compressed data (and the amount of pre-compression data with respect to this compressed data).

The package controller is able to carry out a reclamation process in the flash package of this package controller. In the reclamation process, the package controller makes a transfer-source real block into an empty real block by transferring the valid data inside the transfer-source real block, which is full, to a transfer-destination real block, and performs a delete process with respect to the transfer-source real block (a process for deleting the data stored in the transfer-source real block). Data compression and extension may be carried out in this reclamation process.

REFERENCE SIGNS LIST

100 Storage system
110 Host
120 Storage area network (SAN)
200 Storage controller
210 Cache memory
220 Common memory
230 Flash package
250 Connecting unit
260 Processor
270 Memory
280 Flash package group
300 Flash chip
310 Package processor
320 Package memory
330 Buffer
340 Package bus
350 Bus transfer device
360 Compression extension circuit
2000 Logical volume information
2100 Real page information
2300 Flash package group information
2500 Flash package information
3000 Package information
3100 Chip information
3200 Virtual block information
3300 Real block information
4000 Read process execution part
4100 Write request receive part
4200 Write after process execution part
4300 Write same command process execution part
4500 Page transfer process execution part
12000 Data read process execution part
12100 Data write process execution part
12200 Real block release process execution part
12300 Virtual block transfer process execution part
12400 Virtual block store process execution part
12500 Virtual capacity judging execution part

The invention claimed is:

1. A storage system comprising:
a plurality of storage devices, and
a storage controller configured to control a set of storage devices among the plurality of storage devices as a RAID group, to manage a plurality of real pages in a pool corresponding to storage space provided by the set of storage devices in the RAID group, to provide a virtual volume including a plurality of virtual pages to a host, to receive a write request indicating an address of the virtual volume for storing write data from the host, to allocate a real page of the plurality of real pages from the pool to a virtual page corresponding to the address of the virtual volume, to manage a number of allocatable real pages in the pool, and to transfer the write data to at least one of the set of storage devices corresponding to the allocated real page;
wherein each storage device compresses the write data sent from the storage controller and stores the compressed data in the storage device,
wherein each storage device generates compression information based on an amount of compressed data stored in the storage device,
wherein each storage device sends the compression information to the storage controller, and
wherein the storage controller changes the number of allocatable real pages in the pool based on the compression information sent from the set of storage devices corresponding to the RAID group.

2. The storage system according to claim 1,
wherein when the storage controller allocates one real page of the plurality of real pages from the pool to the virtual volume, the storage controller decreases one allocatable real page from the number of allocatable real pages in the pool.

3. The storage system according to claim 1,
wherein each storage device includes data storage areas, and
wherein the compressed data is stored in the data storage areas.

4. The storage system according to claim 3,
wherein the compression information is an available amount of the data storage areas based on the amount of compressed data stored in the data storage areas.

5. The storage system according to claim 4,
wherein the storage controller changes the number of allocatable real pages based on a smallest available amount of the data storage areas among the set of the storage devices in the RAID group, according to the compression information sent from each of the set of storage devices corresponding to the RAID group.

6. The storage system according to claim 5,
wherein the storage controller decreases the number of allocatable real pages in the pool, if the smallest available amount of the data storage areas of the set of the storage devices decreases.

7. The storage system according to claim 5,
wherein the storage controller increases the number of allocatable real pages in the pool, if the smallest available amount of the data storage areas of the set of the storage devices increases.

8. The storage system according to claim 3,
wherein the compression information is a compression ratio based on the amount of compressed data stored in the data storage areas and total amount of the write data sent from the storage controller.

9. The storage system according to claim 1,
wherein the storage controller allocates the real page from the pool to the virtual page corresponding to the address of the virtual volume, if the real page is not allocated to the virtual page.

10. A storage system comprising:
a plurality of storage devices, and
a storage controller configured to control a set of storage devices among the plurality of storage devices as a RAID group, to manage a plurality of pages in a pool corresponding to storage space provided by the set of storage devices in the RAID group, to provide a virtual volume to a host, to receive a write request for storing write data from the host, to allocate a page of the plurality of pages from the pool to a part of the virtual volume, to manage a number of allocatable pages in the pool, and to send the write data to at least one of the set of storage devices corresponding to the allocated page;
wherein each storage device compresses the write data sent from the storage controller and stores the compressed data in the storage device,
wherein each storage device generates compression information based on an amount of compressed data stored in the storage device, wherein each storage device sends the compression information to the storage controller, and wherein the storage controller changes the number of allocatable pages in the pool based on the compression information sent from the set of storage devices corresponding to the RAID group.

11. The storage system according to claim 10,
wherein when the storage controller allocates one page of the plurality of pages from the pool to the virtual volume, the storage controller decreases one allocatable page from the number of allocatable pages in the pool.

12. The storage system according to claim 10,
wherein each storage device includes data storage areas, and
wherein the compressed data is stored in the data storage areas.

13. The storage system according to claim 12,
wherein the compression information is an available amount of the data storage areas based on the amount of compressed data stored in the data storage areas.

14. The storage system according to claim 13,
wherein the storage controller changes the number of allocatable pages based on a smallest available amount of the data storage areas among the set of the storage devices in the RAID group, according to the compression information sent from each of the set of storage devices corresponding to the RAID group.

15. The storage system according to claim 14,
wherein the storage controller decreases the number of allocatable pages in the pool, if the smallest available amount of the data storage areas of the set of the storage devices decreases.

16. The storage system according to claim 14,
wherein the storage controller increases the number of allocatable pages in the pool, if the smallest available amount of the data storage areas of the set of the storage devices increases.

17. The storage system according to claim 12,
wherein the compression information is a compression ratio based on the amount of compressed data stored in the data storage areas and total amount of the write data sent from the storage controller.

18. The storage system according to claim 10,
wherein the storage controller allocates the page from the pool to the part of the virtual volume, if the page is not allocated to the virtual volume.

* * * * *